United States Patent [19]
Obregon

[11] 3,786,930
[45] Jan. 22, 1974

[54] UNDERGROUND AUTOMATIC PARKING SYSTEM FOR VEHICLES

[76] Inventor: Alejandro Obregon, Horacio 543-403, Mexico City, Mexico

[22] Filed: Aug. 9, 1972

[21] Appl. No.: 279,268

[30] Foreign Application Priority Data
Sept. 8, 1971 Mexico ............................... 129985

[52] U.S. Cl. ........................................ 214/16.1 CB
[51] Int. Cl. .............................................. E04h 6/06
[58] Field of Search ............................. 214/16.1 CB

[56] References Cited
UNITED STATES PATENTS
2,647,647 8/1953 Alimanestiano ................... 214/16.1

Primary Examiner—Gerald M. Forlenza
Assistant Examiner—R. B. Johnson
Attorney, Agent, or Firm—Stevens, Davis, Miller & Mosher

[57] ABSTRACT

An underground automatic parking system for vehicles, comprising a horizontal tunnel; a rectangular entrance opening on the roof of said tunnel; slidable horizontal doors closing said opening; grids in said doors located at a position suitable to receive the four tires of a vehicle; a carriage movable along the length of said tunnel at an intermediate transit level thereof; the carriage is provided with anchoring means to coact with anchoring blocks provided on the tracks along which said carriage moves, in order to automatically stop the carriage in alignment with a selected parking space; elevator means in said carriage comprising two pairs of comb-like sets of parallel brackets rotatable about respective axes in a position such that the brackets match the position of the four tires of a vehicle, said brackets being such that, when the elevator means are elevated to its uppermost position, said brackets pass between the grids of said doors to support a vehicle located thereon; an upper parking level in said tunnel comprising a plurality of upper parking spaces each being provided with four sets of retractible vehicle supporting brackets, interleavable with the brackets of said elevator means, each set of vehicle supporting brackets being provided with a ratchet mechanism to retain the same in operative position; a lower parking level in said tunnel comprising a plurality of lower parking spaces each being provided with four vehicle supporting cradles, each cradle comprising a grid interleavable with the brackets of said elevator means; said intermediate transit level comprising a lower sub-level to allow the transit of the carriage with its elevator means carrying a vehicle thereon and an upper sub-level to allow the transit of the carriage with its elevator means empty; means for driving said carriage along the length of said tunnel; means for driving said elevator means between the transit level and the upper and lower parking levels and between the transit level and the entrance opening; means for extending and retracting said retractible vehicle supporting brackets of the upper parking level; means for retracting and extending the brackets of said elevator means, when the same are lowered to the lower parking level in order to clear a vehicle parked in a lower parking space; electric detecting means in each parking space to coact with the carriage in order to detect an empty parking space when the carriage is carrying a vehicle thereon; and means for deactivating said detecting means in order to allow the carriage to travel past an empty parking space when it is not desired to park a vehicle therein.

23 Claims, 24 Drawing Figures

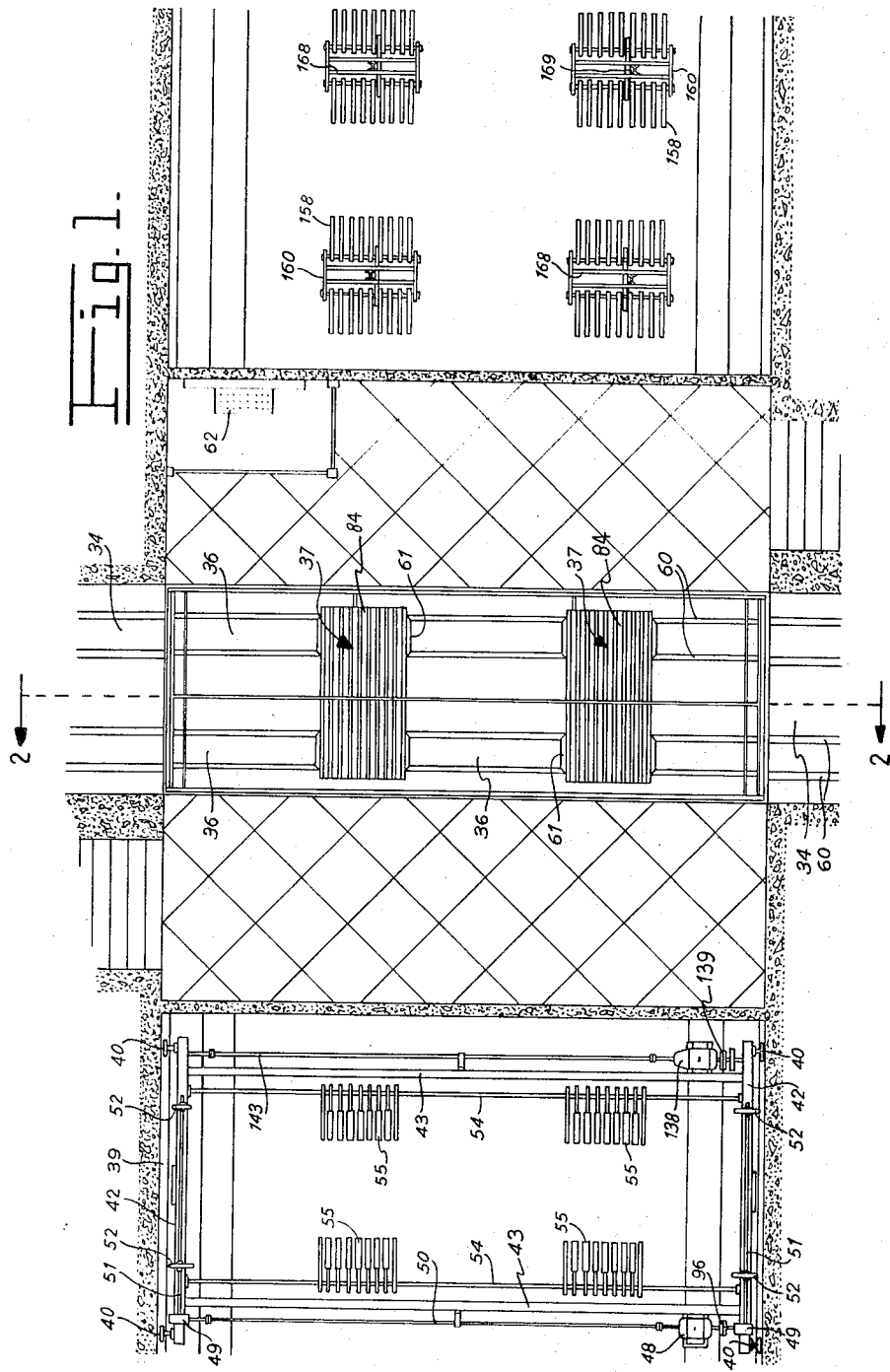

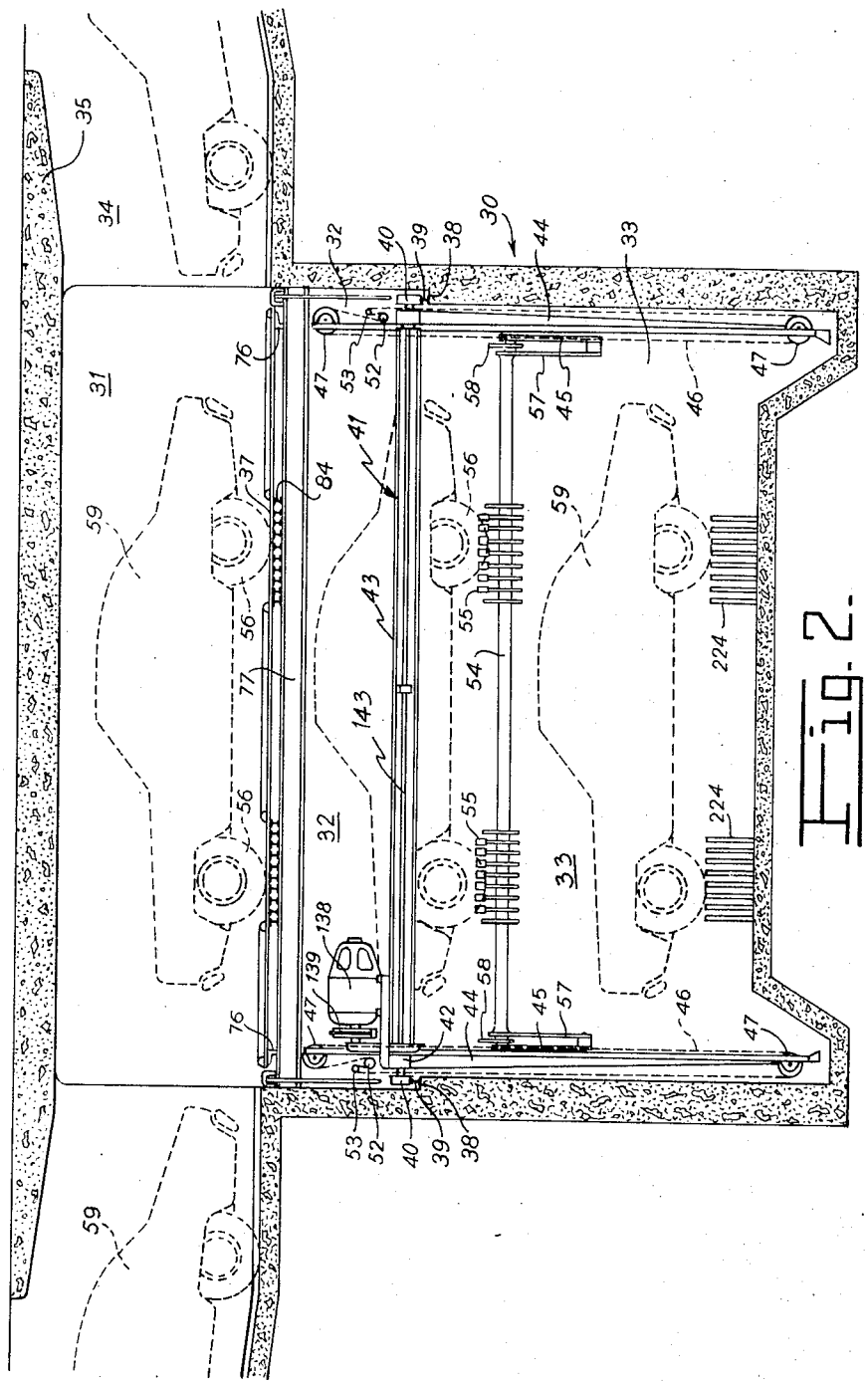

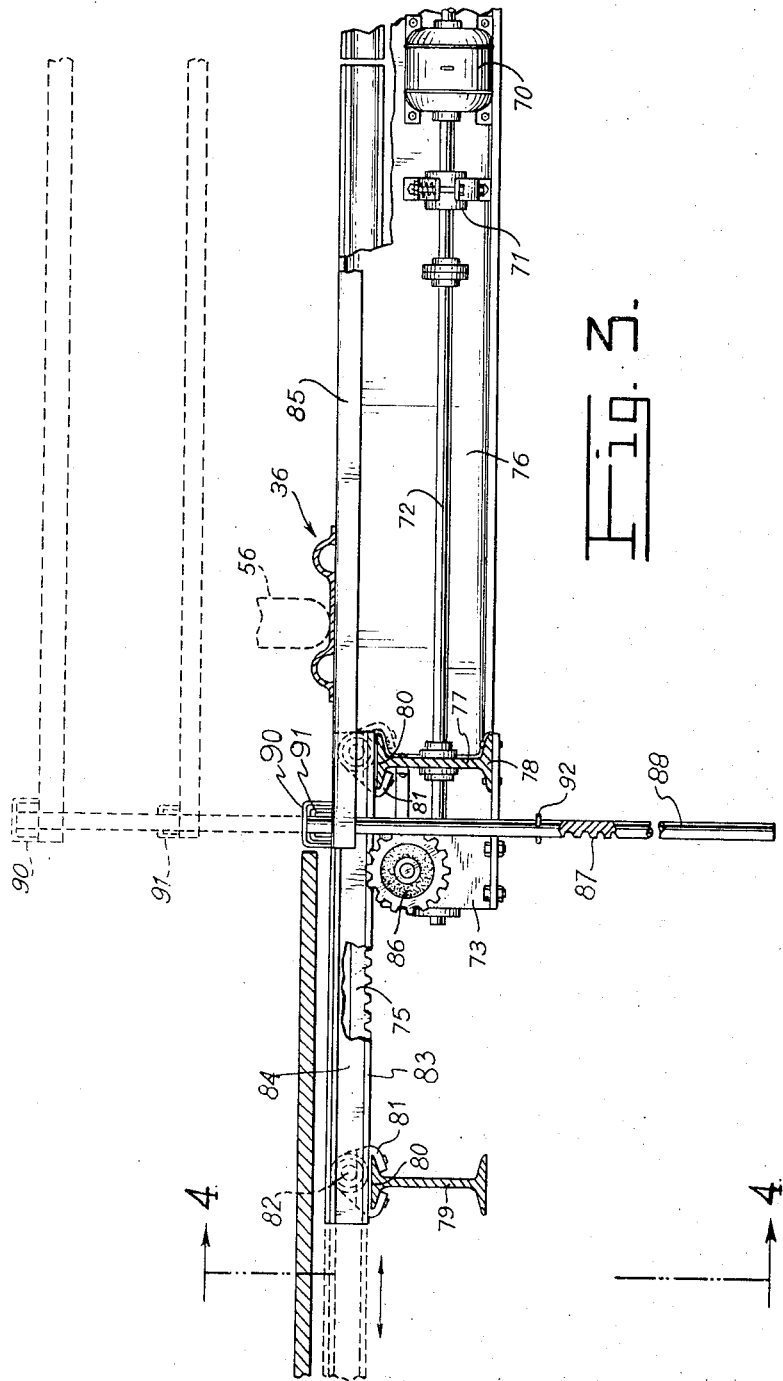

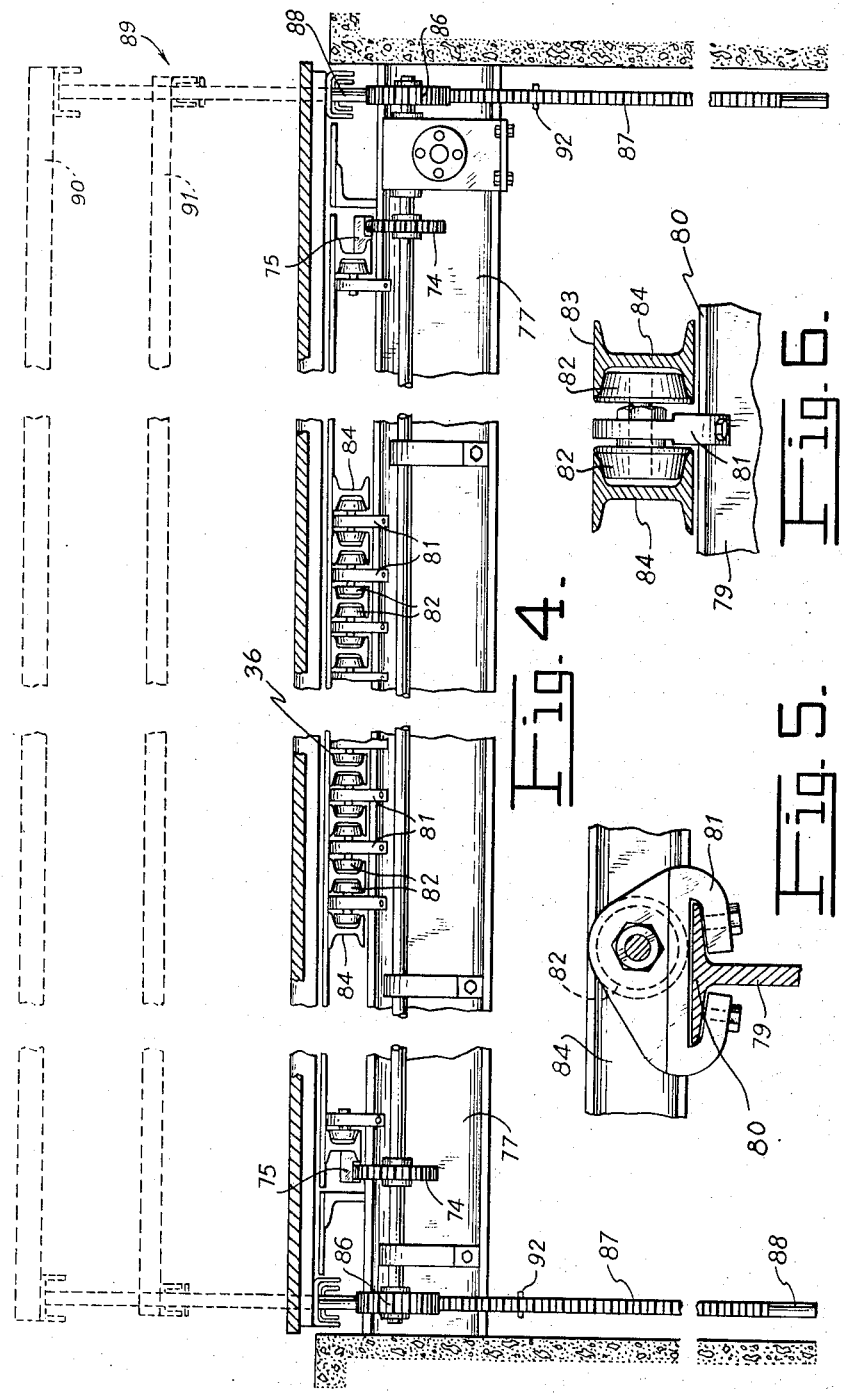

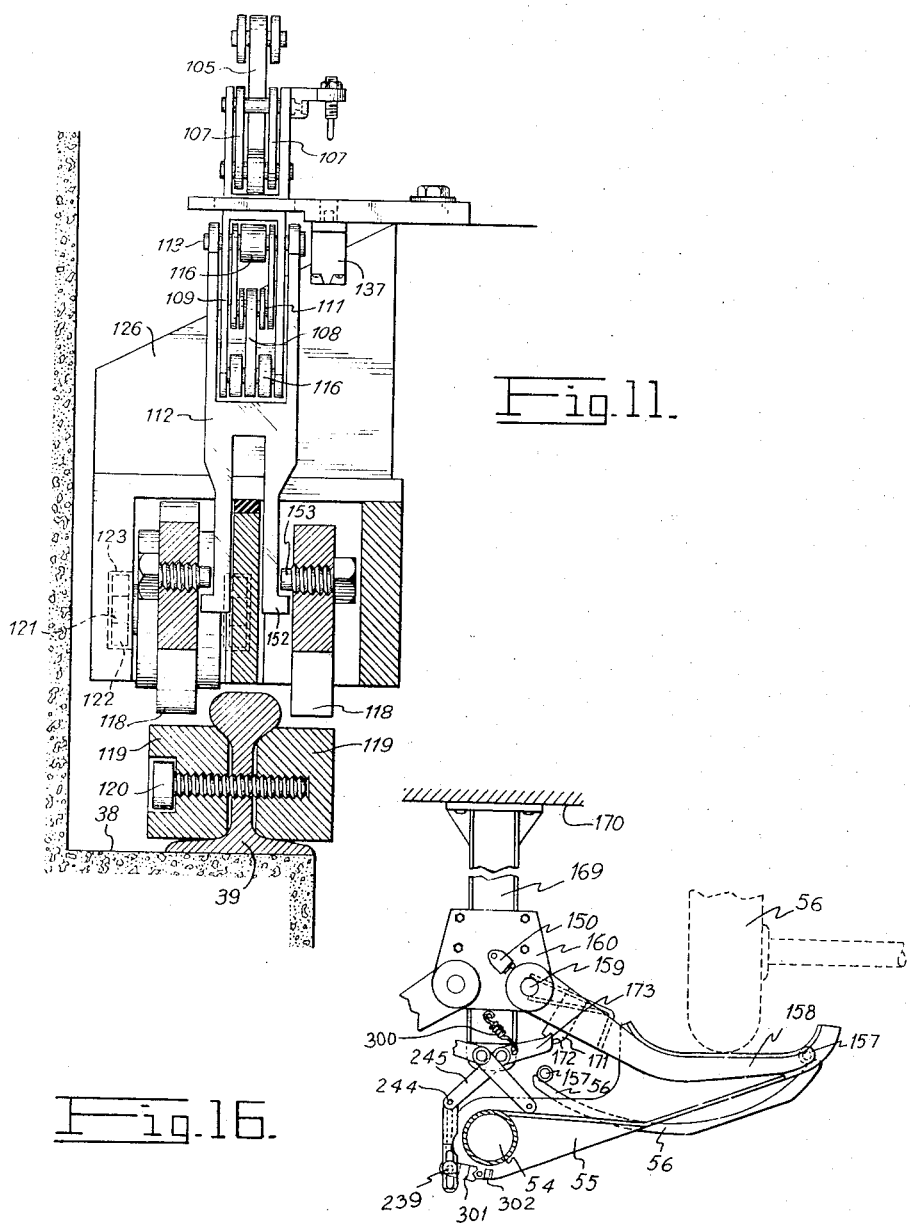

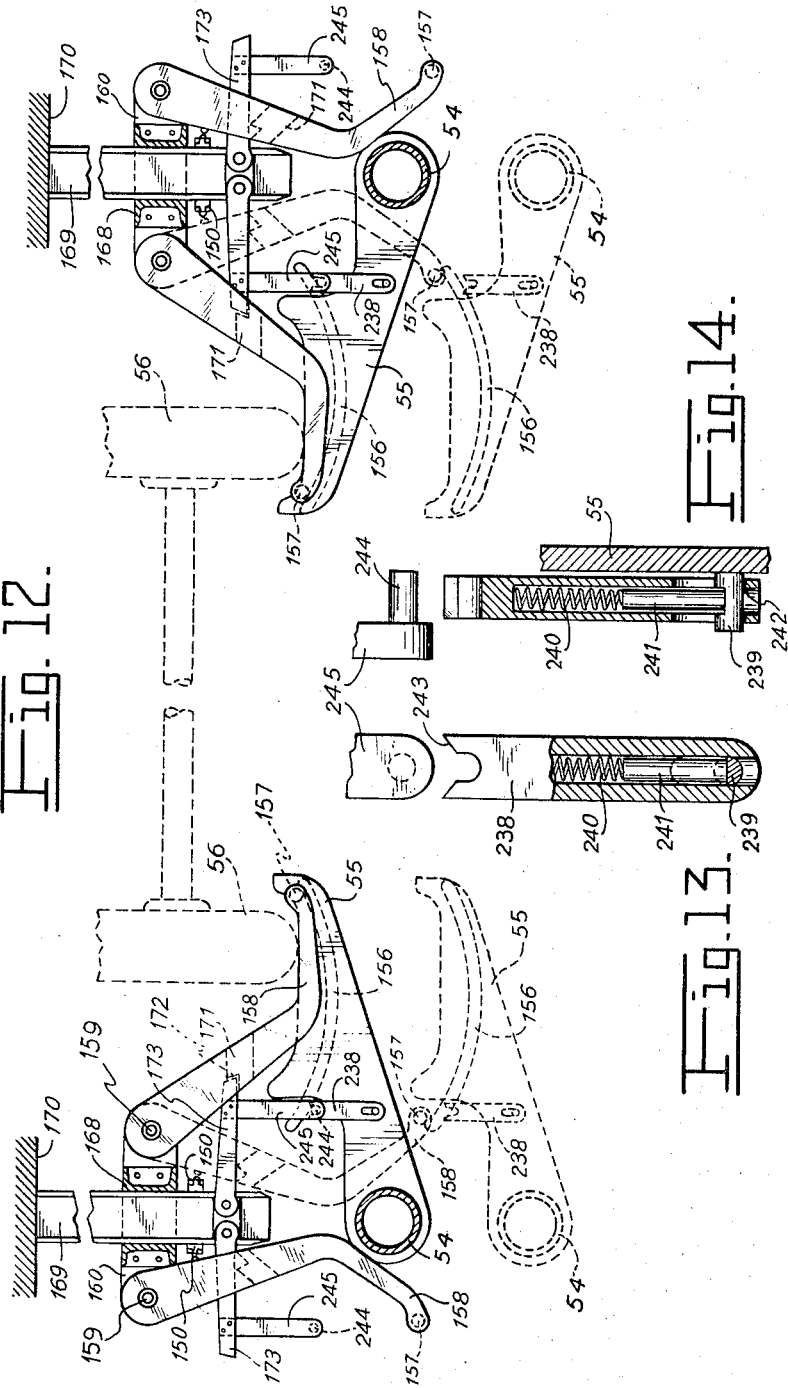

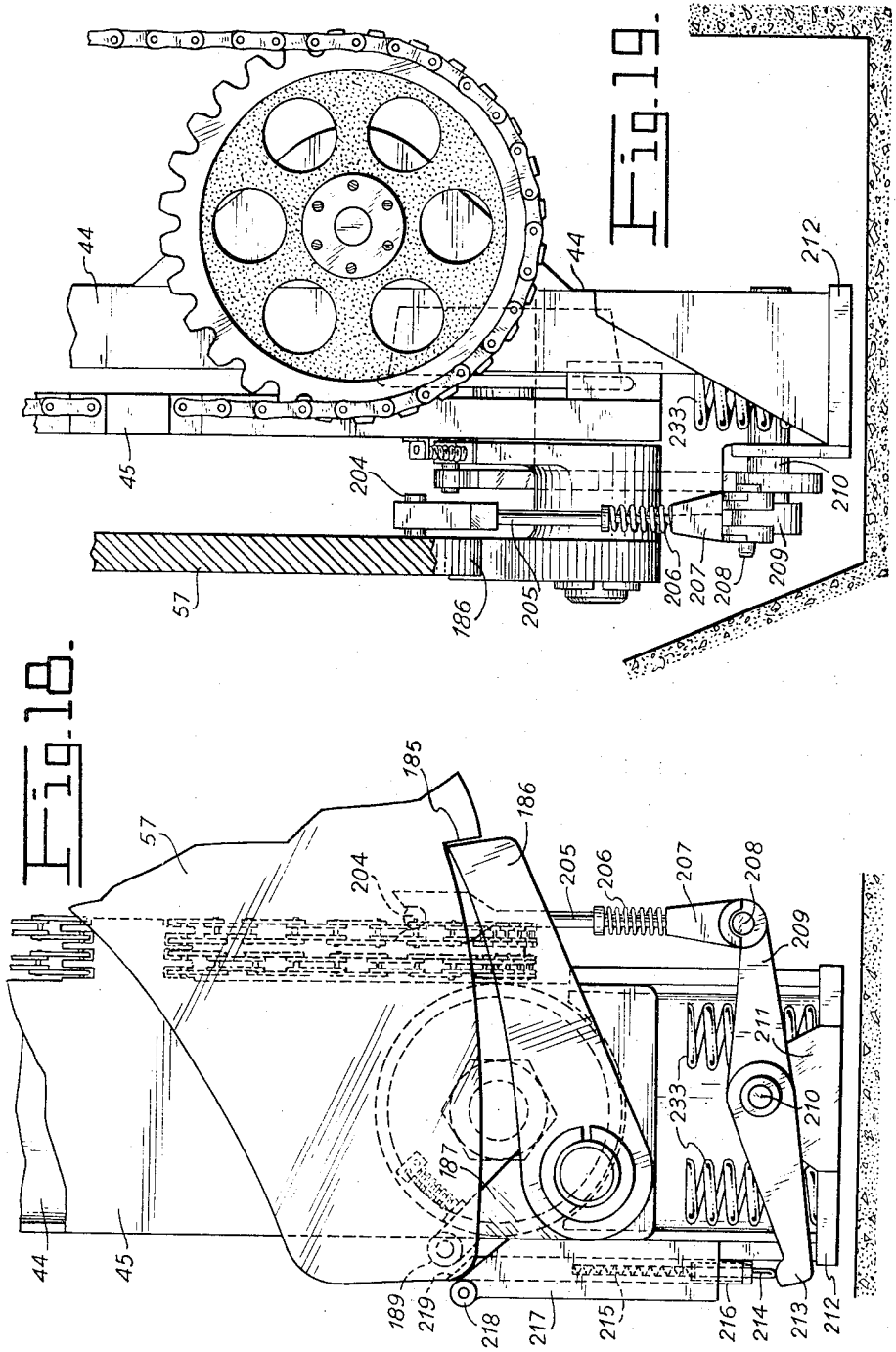

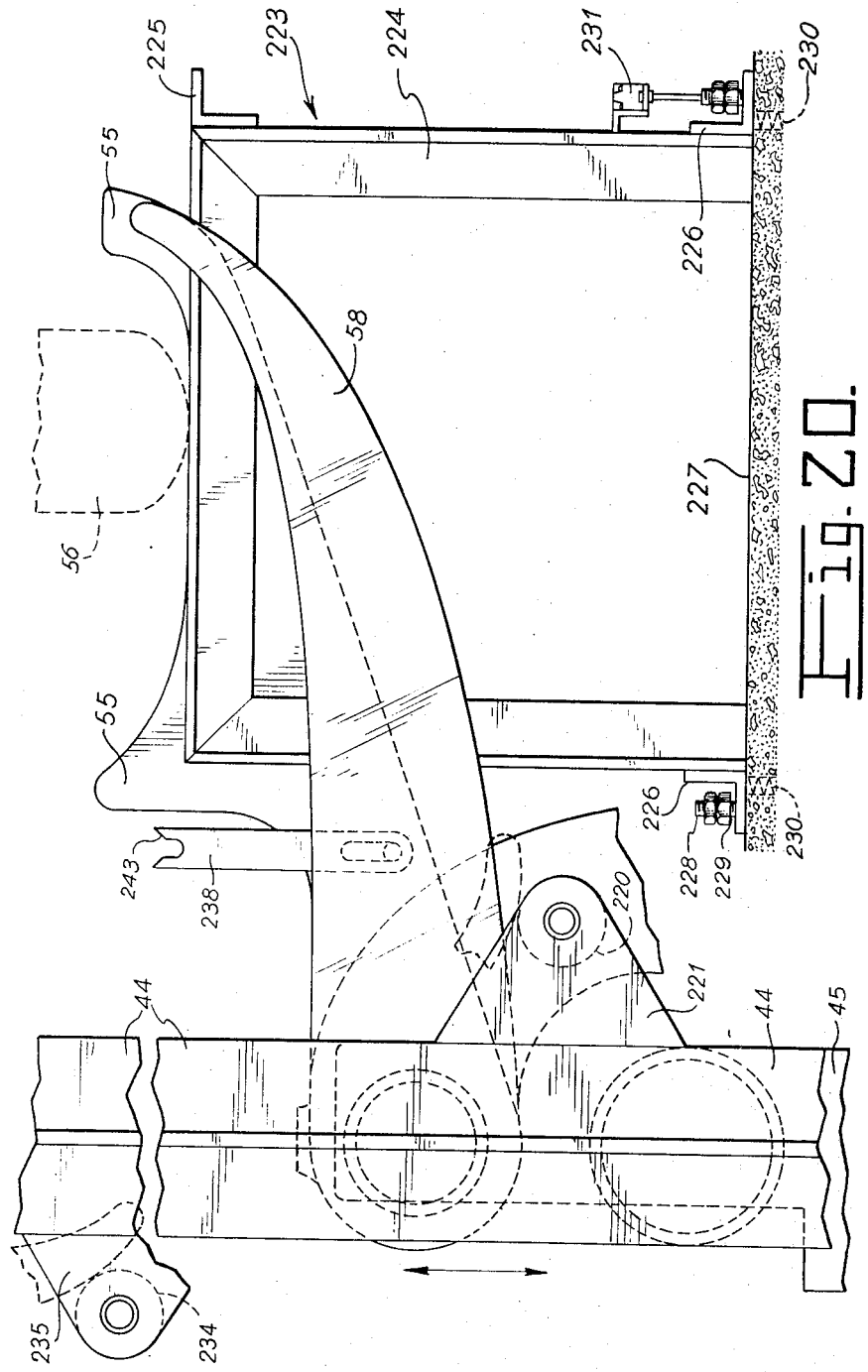

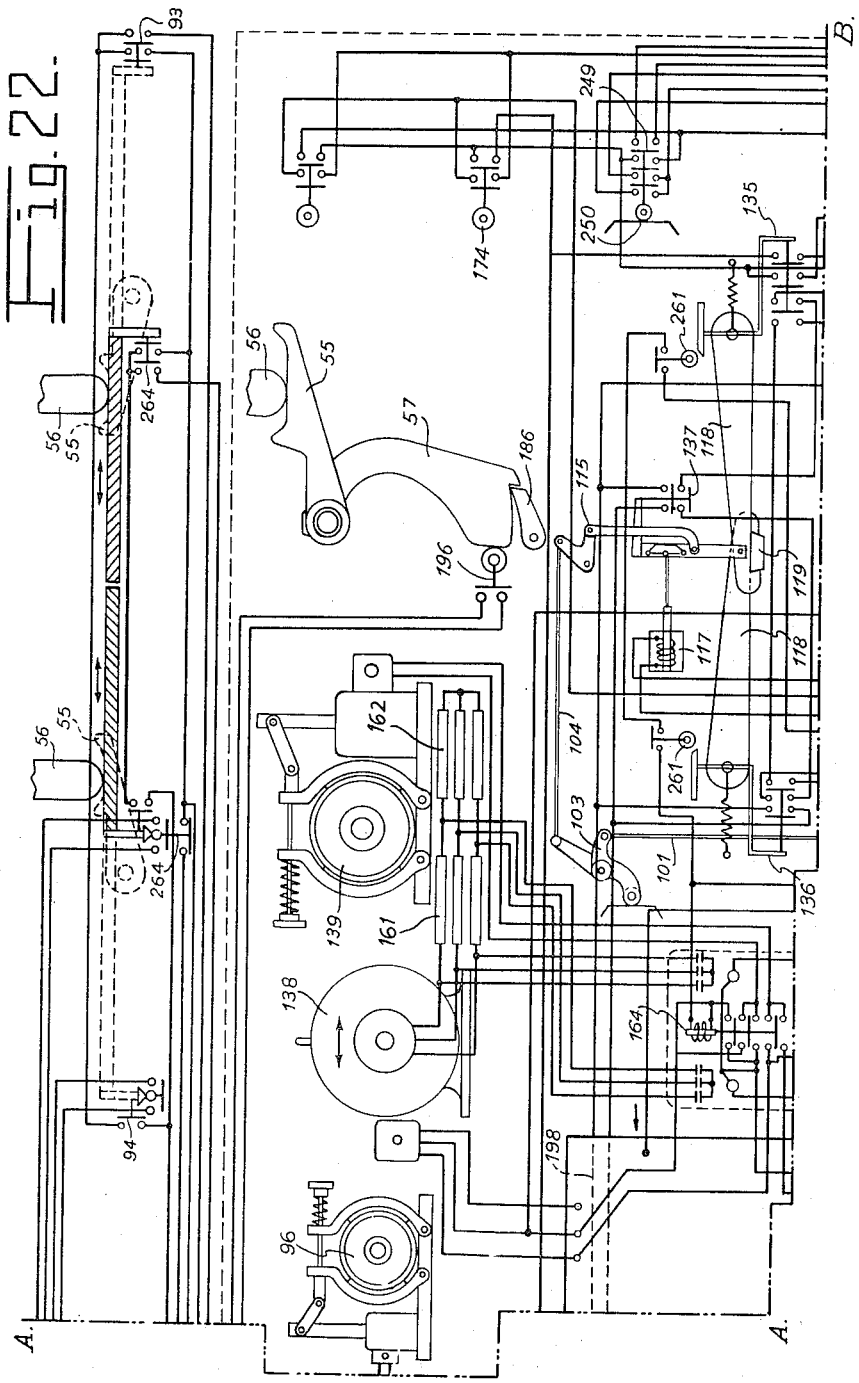

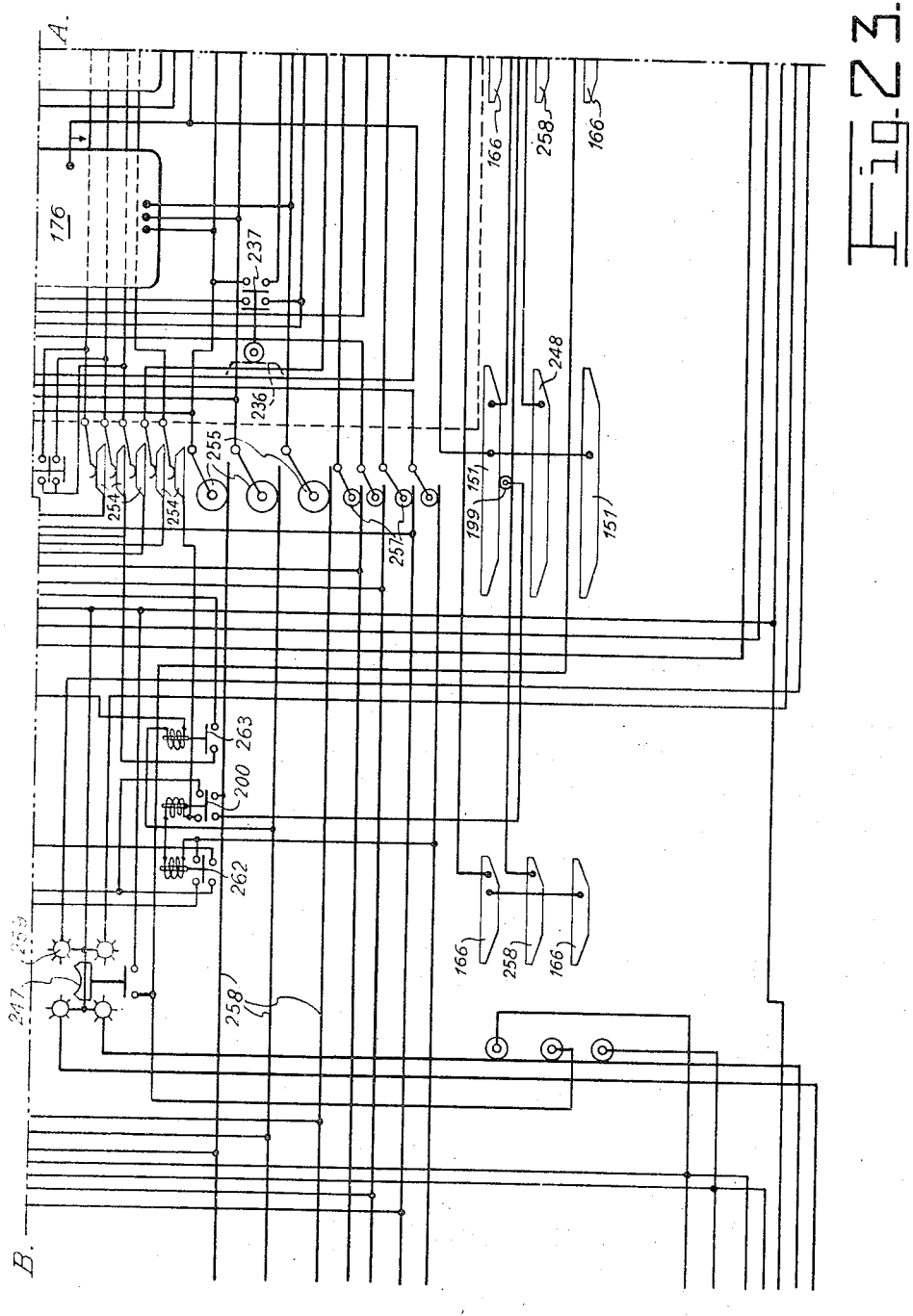

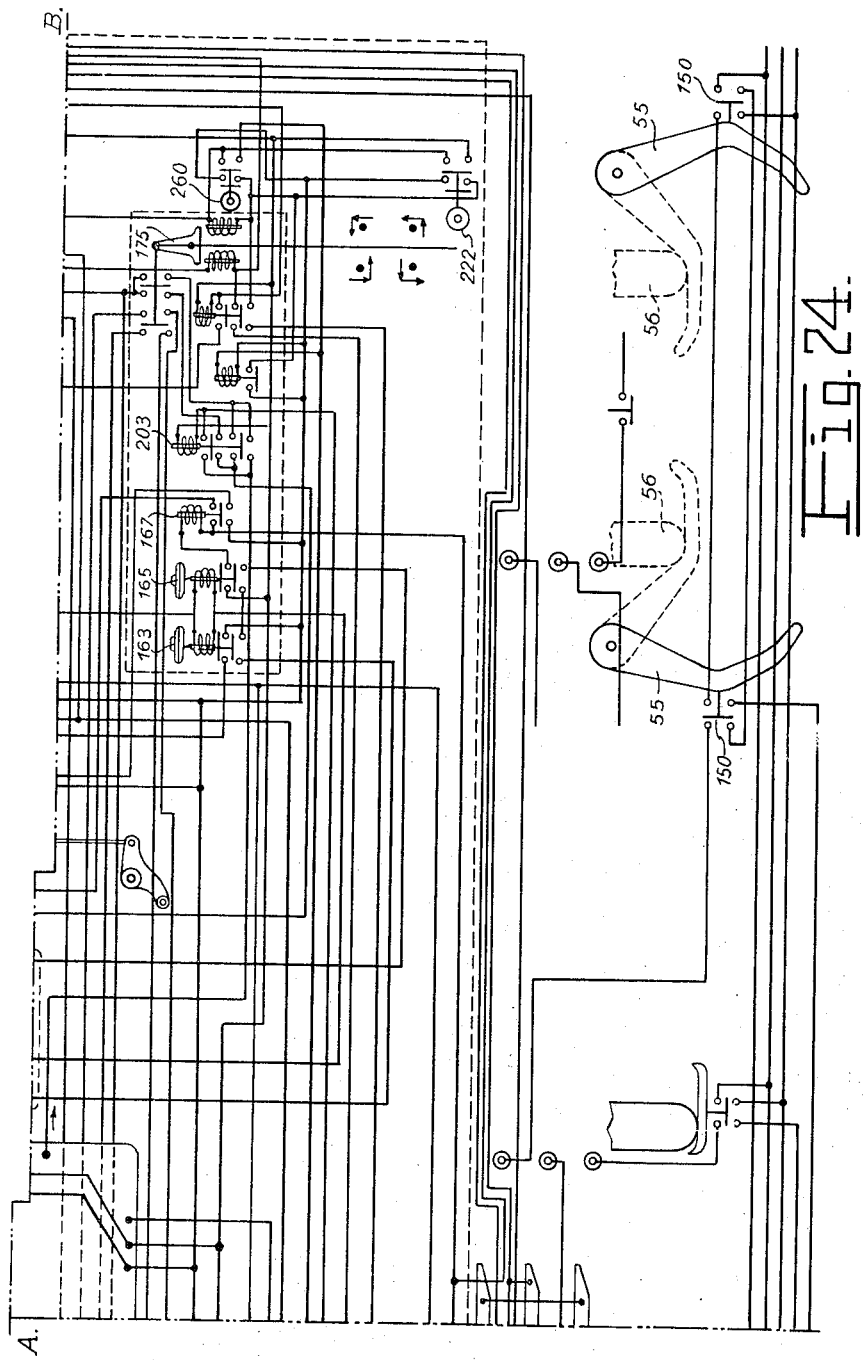

UNDERGROUND AUTOMATIC PARKING SYSTEM FOR VEHICLES

BACKGROUND OF THE INVENTION

The present invention refers to a parking system for vehicles and, more particularly, it is related to an underground automatic parking system for vehicles, which is quite unconspicuous and does not interfere with the normal traffic on the streets.

It is a very well known fact all over the world that the parking of vehicles in predetermined areas of large cities is a particularly difficult problem, moreso when areas of great commercial activities are considered, because there is an extraordinary flow of vehicles into said areas, which creates a very high traffic density which does not allow for parking vehicles on the streets. On the other hand, the parking systems of the prior art have left much to desire and are absolutely inefficient. In effect, when said systems merely comprise large lots of land wherein the vehicles are accommodated in a completely disorganized manner, a numerous personnel is required to drive the vehicles and statistics show that accidents and burglary are quite frequent in this type of parking lots. Prior art parking systems consisting of buildings of several floors wherein entrance and exit ramps are built for the transit of vehicles are also quite disadvantageous in that the vehicles are normally spoiled by the personnel in charge of said parking buildings when the vehicles are driven up and down the ramps. While in some parking buildings having several parking floors, elevator systems have been provided, nevertheless the vehicles have to be driven by a person whose ability is rather doubtful and who does not care too much about what may occur to the mechanisms of the vehicle when driving the same.

Therefore, for long a solution has been sought to solve the problem of lack of fully automatic parking systems in which, once the owner of the vehicle applies for the services of the establishment, he can leave his vehicle locked, as it will not be driven by the personnel in charge of the parking system.

On the other hand, the prior art parking buildings require a substantial area of land and must be built where perhaps more profitable buildings could be built instead.

The prior art has also provided underground parking systems, but these merely comprise a basement or the like, in which all the vehicles are placed by drivers, also in a completely disorganized manner which does not solve the problem of parking vehicles in heavy traffic areas of a city.

SUMMARY OF THE INVENTION

Having in mind the defects of the prior art parking systems, the present invention provides an underground, fully automatic parking system for vehicles, which overcomes all the disadvantages of the prior art parking systems and avoids the necessity of driving the vehicles within the parking space by uncapable personnel.

The present invention also provides an underground parking system for vehicles, of the above mentioned character, in which the vehicles are placed in different parking spaces by mechanical means which are fully automatic and do not need the intervention of personnel to drive said vehicles.

This invention also provides an underground parking system for vehicles, of the above described character, which in spite of being fully automatic, is very easy to build and very efficient to operate.

The present invention also provides an underground parking system for vehicles, of the above mentioned character, which provides for the simultaneous operation of accommodating a vehicle in an empty parking space and taking a vehicle from an occupied parking space in the same voyage of the carriage, in a time which is very short as compared to the time normally involved in accommodating a vehicle in and taking another vehicle from a parking place of any prior art parking system.

This invention also provides an underground parking system for vehicles, of the above mentioned characteristics, which is capable of a completely underground installation, in order to avoid interference with the normal traffic on the streets or with the pedestrians walking on side-walks and on parks.

BRIEF DESCRIPTION OF THE DRAWINGS

The novel features which are considered characteristic of the present invention are set forth with particularity in the appended claims. The invention itself, however, both as to its organization and its method of operation, together with additional objects and advantages thereof, will best be understood from the following description of a specific embodiment, when read in connection with the accompanying drawings, in which:

FIG. 1 is a fragmentary top plan view, partially broken away to show inner details, of the underground parking system built in accordance with the present invention;

FIG. 2 is a cross sectional elevational view of the underground parking system in accordance with the invention, taken along lines 2—2 of FIG. 1 and looking in the direction of the arrows;

FIG. 3 is a fragmentary elevational view, partly borken away to show inner details, of the entrance section of the underground parking system built in accordance with the invention, and showing the mechanism for operating the doors;

FIG. 4 is a cross sectional elevational view taken along lines 4—4 of FIG. 3 and looking in the direction of the arrows;

FIG. 5 is a detailed elevational view of one of the supports on which the beam members of the system for operating the doors slide;

FIG. 6 is a detailed elevational view, partly in cross section, of one of the supports on which the grid forming members of the doors slide;

FIG. 11 is a cross sectional elevational view taken along lines 11—11 of FIG. 10 and looking in the direction of the arrows;

FIG. 12 is a cross sectional elevational view of the upper tire-supporting bracket system of the underground parking system of the present invention, taken along lines 12—12 of FIG. 15 and looking in the direction of the arrows;

FIG. 13 is a fragmentary elevational view of the ratchet actuating mechanism to operate the pawl for locking the upper tire-supporting brackets in operative position;

FIG. 14 is a view similar to FIG. 13, but taken at an angle of 90° with respect thereto;

FIG. 16 is a fragmentary elevational view of another preferred embodiment of the upper tire-supporting brackets built in accordance with the present invention;

FIG. 18 is a detailed fragmentary elevational view of the mechanism for retracting the tire-supporting brackets of the elevator mechanism to cooperate with the lower tire-supporting cradles of the underground parking system of the present invention;

FIG. 19 is a view similar to FIG. 18, but taken at an angle of 90° with respect thereto;

FIG. 20 is a fragmentary elevational view, partly broken away to show inner details, of the tire-supporting cradles of the lower parking level, also showing one of the tire-supporting brackets of the elevator mechanism coacting therewith; and FIGS. 21, 22, 23 and 24 are complementary diagramatic views of an exemplary electrical circuitry which can be used to operate the underground parking system of the present invention.

DETAILED DESCRIPTION

Figure 7:
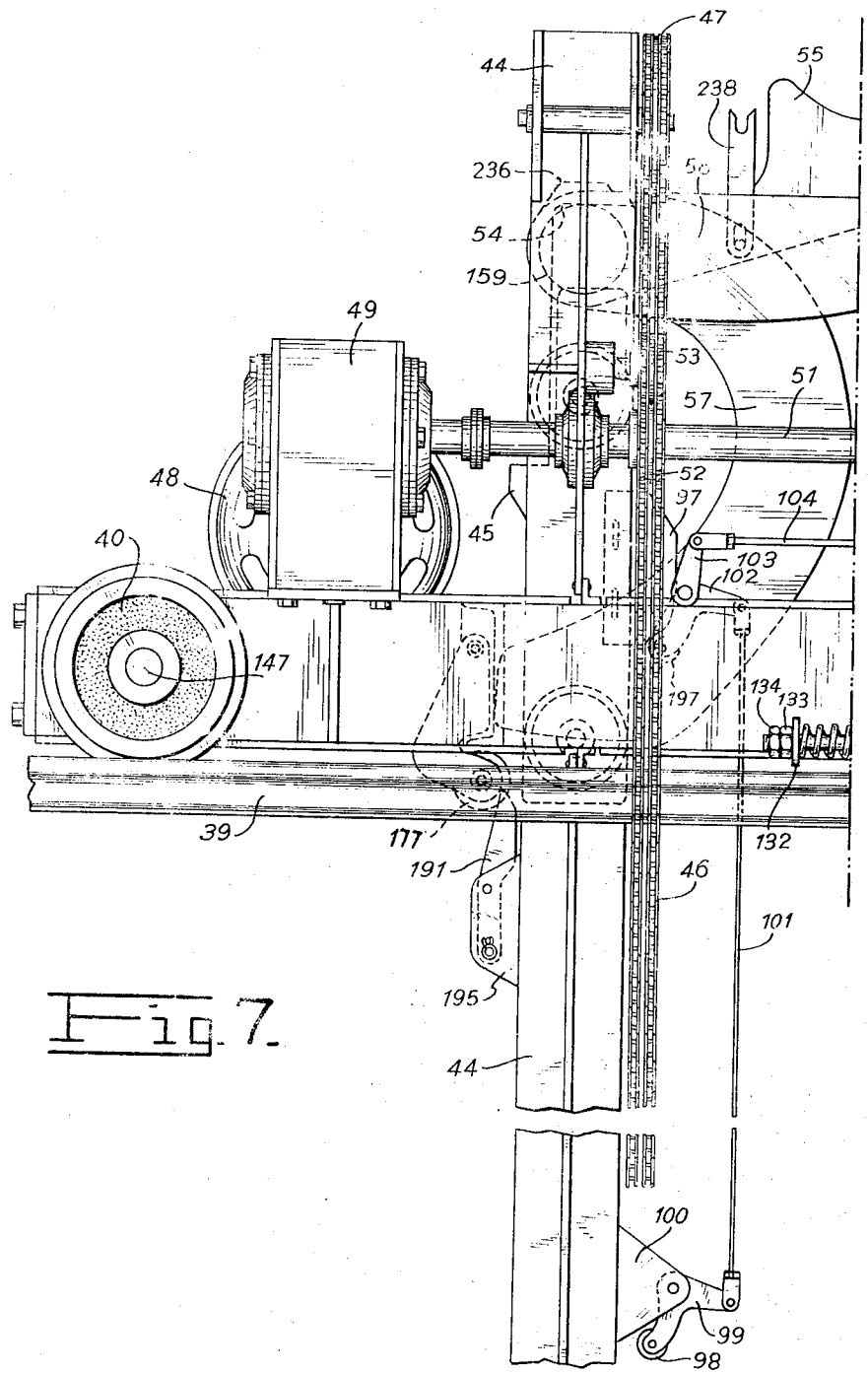
FIGS. 7, 8 and 9 are complementary elevational views, with parts broken away to show inner details, of the carriage of the underground parking system built in accordance with the present invention.

Having now more particular reference to the drawings, and more specifically to FIGS. 1 and 2 thereof, the underground automatic parking system built in accordance with the present invention comprises a tunnel 30 comprising three different levels, namely, an upper parking level 31, an intermediate transit level 32 and a lower parking level 33, as clearly illustrated in FIG. 2 of the drawings.

The entrance means for admitting vehicles such as automobiles 59 into the tunnel 30 of the underground parking system of the present invention, preferably but not necessarily comprises an underground passage 34 provided with two guiding channels 60 in order to properly guide the tires 56 of the vehicle 59 along the above mentioned passage.

A pair of horizontally slidable doors 36 is placed on top of the tunnel 30, and the guiding channels 60 are extended over each of said doors 36 as clearly shown in FIG. 1 of the drawings, said guiding channels forming a transverse end bump located immediately adjacent respective grids 37 built in the doors 36 with a plurality of beam members 84 which will be described in more detail hereinbelow. Each door 36 is provided with a pair of grids 37 having an area sufficient to accommodate the four tires of automobiles of any model or size, so that all four tires 56 of the vehicles may be placed within said grids 37, as clearly shown in FIG. 2 of the drawings.

The parking system built in accordance with the present invention may be provided with an area for pedestrians on which a control keyboard 62 may be placed in order to control all the operations of the carriage 41 and all other mechanisms as will be described hereinbelow.

Two opposite longitudinally extending shoulders 38 are provided on each side wall of tunnel 30, as shown in FIG. 2 of the drawings, and respective tracks or rails 39 are fixed on said shoulders 38. The carriage 41 is formed by a frame comprising longitudinal members 43 extending in a direction transverse to the direction of movement of said carriage, and transverse members 42 which extend longitudinally to the direction of movement of said carriage. The frame of the carriage 41 is movably supported on the rails 39 by means of a plurality of wheels 40, preferably four wheels, which roll on said rails 39.

The carriage 41 is provided with a motor 138 and brake 139 which, through a suitable drive mechanism, drives the wheels 40 in order to move the carriage along rails 39 as will be described in more detail hereinafter.

Four vertical columns 44 are provided, fixedly engaged to the frame 42, 43, and extending from a point near the upper parking level to a point near the lower parking level, in order to guide corresponding slides 45 which are attached to endless chains 46. Chains 46 are threaded around two end sprockets 47, and also around sprockets 52 and 53 for tensioning purposes. The slides 45 driven by chains 46, support a pair of rods or tubes 54, in which four comb-like sets of brackets 55 are fixedly attached, in positions suitable to receive the four tires of a vehicle 59 which is to be parked in the underground parking system of the present invention. Each of the tubes 54 can be rotated by means of suitable cams 57 and 58 located at the ends of each tube 54.

The elevator mechanism provided by the tubes 54, brackets 55 and slides 45, is moved up and down the tunnel 30 by means of a motor 48, through a suitable drive system comprising a shaft 50 for transmitting the power of motor 48 from one end to the other of the carriage 41, as can be clearly seen in FIG. 1 of the drawings.

Brackets 55 of the elevator mechanism of the carraige 41, are driven by the chain and sprocket mechanism 46, 47, to an upper level such that the brackets 55 interleave with the beam members 84 of the grids 37 of doors 36, in order to lift the vehicle tires 56 so as to clear the doors 36 and permit the corresponding retracting mechanism to open said doors as will be described hereinbelow.

Both the upper and lower parking levels of the tunnel 30 are provided, at each individual parking space, with four supporting mechanisms to receive the tires 56 of the vehicles 59 to be parked, and FIG. 1 illustrates the upper level tire-supporting mechanism which comprises four comb-like sets of brackets 158 supported by means of plates 160 in turn supported by hangers 169 which are fixed to the roof of tunnel 30. Correspondingly, the parking spaces of the lower parking level are provided each with four tire-supporting cradles 224, as shown in FIG. 20 of the drawings, in order to receive the tires 56 of vehicles 59 to be parked. The above described elevator mechanism is capable of carrying the tire-supporting brackets 55 of said elevator to a level slightly higher than the upper supporting brackets 158 in an extended condition, and to a level slightly lower than the tops of cradles 223 of the lower parking level, for a purpose which will be perfectly understood from the following description of said elements.

The entrance mechanism of the underground parking system built in accordance with the present invention, as mentioned above, comprises two slidable horizontal doors 36 spanning a space of a size such that a vehicle 59 can be lowered by the elevator mechanism of carriage 41 when the doors 36 are completely retracted, and such that said doors 36 may support the vehicle 59 when the latter is placed in a position such that the four tires thereof lay on the members 84 of grids 37, to be picked up by brackets 55 of the elevator mechanism.

Once the brackets 55 take the load of the vehicle 59, the doors 36 are released, and upon a proper command sent from the keyboard 62, the motor 70 and brake 71 simultaneously coact on members 84 of doors 36, in order to retract the same.

This mechanism is very clearly shown in FIGS. 3, 4, 5 and 6 of the drawings, in which it is shown that each door 36 comprises a plurality of beam members 84, some of which form the grids 37 of the doors as described above. Some of the beam member 84 are slidably supported on a plurality of rollers 82 which in turn are rotatably supported on clamps 81, said clamps 81 being clamped around the upper flanges 80 of an I-beam 77 located at a place immediately adjacent to the span covered by doors 36 and I-beam 79 located under the roof as clearly shown in FIG. 3 of the drawings. The upper flanges of beam members 84 bear on rollers 82 supported on beams 77 and 79, thus enabling said doors to be slidably retracted or extended to open or close the entrance opening of the underground parking system of the invention, as clearly shown by the dotted lines of FIG. 3 of the drawings.

The mechanism for retracting and extending the doors 36, comprises a motor 70 which is provided with two colinear shafts 72, one for each door 36, said motor 70 being supported on the channel 76 transversely located with respect to I-beam 77 as described above. On the channel 76 there is provided a brake 71 for each shaft 72, and the shaft 72 is rotatably supported by means of a journal fixed on the web of the I-beam 77, and through a speed reducer 73 to drive a pair of pinnions 74, each of which is meshed to a rack 75, one at each end of the doors 36 as clearly shown in FIG. 4 of the drawings, said racks 75 being integrally engaged to respective members 84 to provide for the sliding motion of doors 36 in response to motor 48.

The speed reducer 73 is also provided with additional pinnions 86, one at each end of doors 36, to act upon a vertical rack 87 which vertically drives a banister 89 comprising a pair of handrails 90 and 91, the upper handrail 90 being fixed on the upper end of the rod 88 in which rack 87 is undercut, and the lower handrail 91 being loosely accommodated around the rods 88, whereby, when the rods are lowered, the handrail 91 will bear on the floor nested within the upper handrail 90, as shown in full lines in FIG. 3 of the drawings. The upper handrail 90 is lifted by the rod 88 in view of the fact that it is integral therewith, and the lower handrail 91 is lifted by a tongue 92 provided at a proper position on each rod 88. It will be obvious that the mechanism is arranged such that, when the doors 36 are opened, the banister 89 will be lifted to a position as shown by the dotted lines in FIGS. 3 and 4 of the drawings, while when the doors 36 are closed, the banister 89 will be retracted as shown in full lines in the above mentioned figures. This will avoid any possible accident when the entrance opening of the underground parking system is open to admit a vehicle 59 into the tunnel 30.

Figure 8:
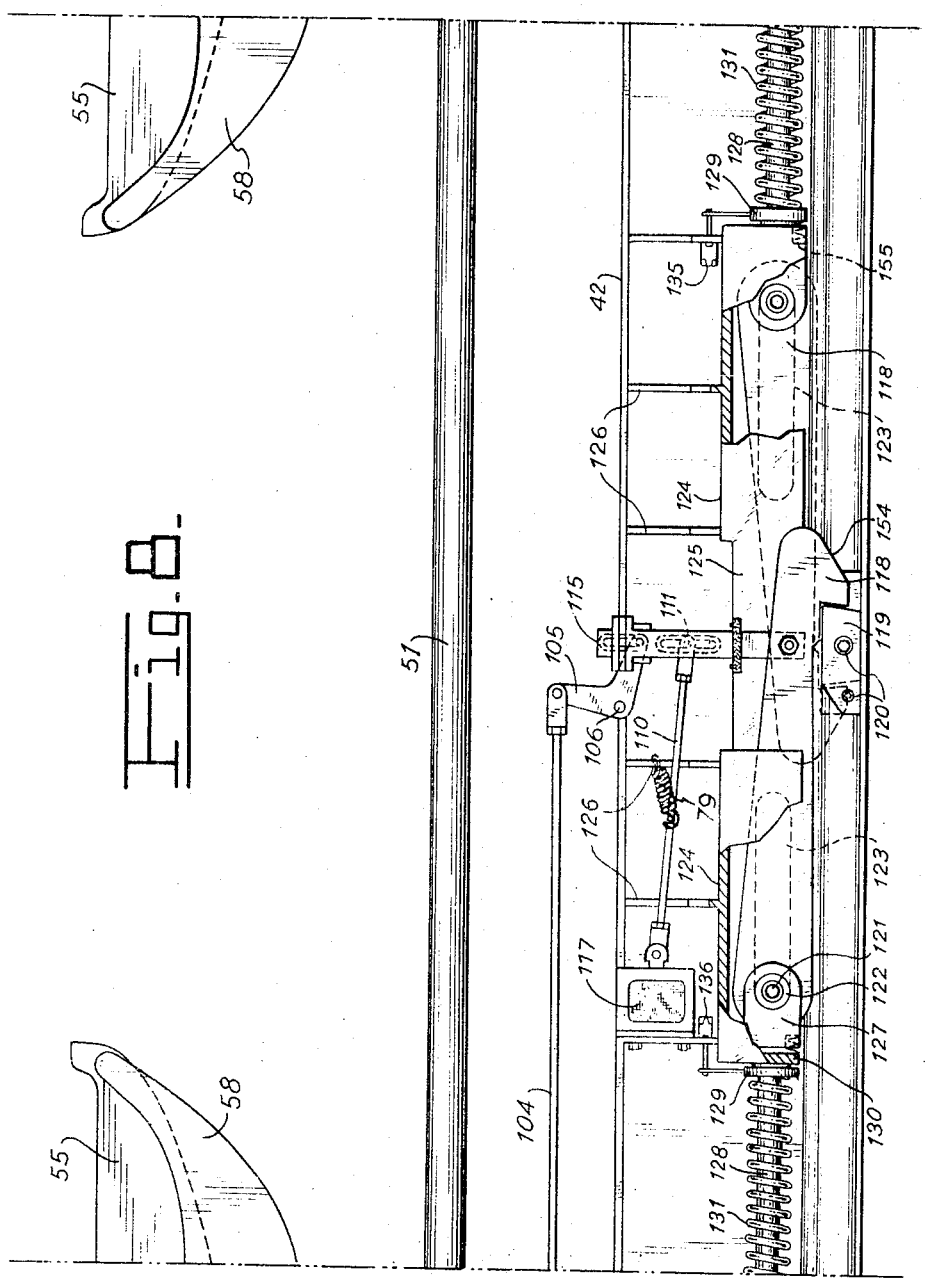
Figure 9:
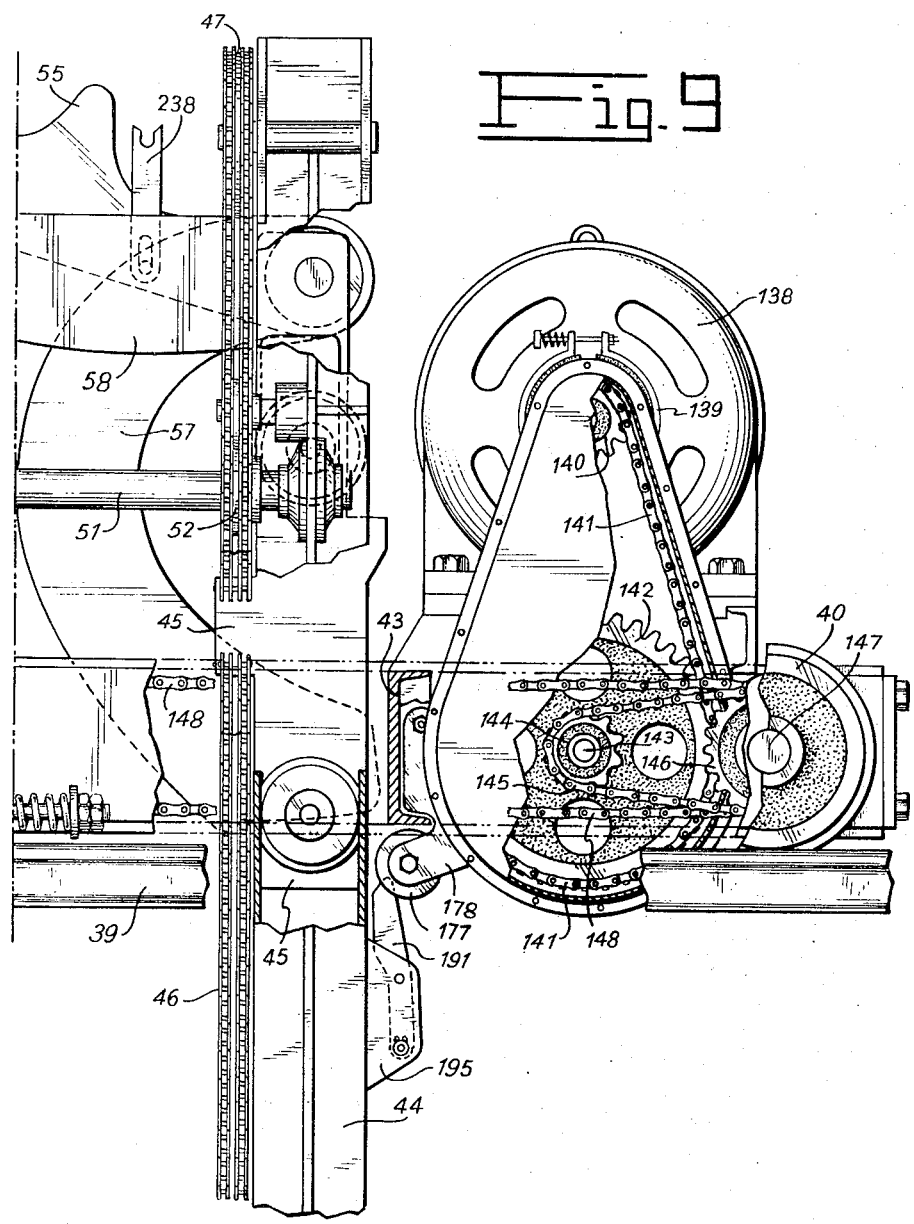

FIGS. 7, 8 and 9 complementarily illustrate the structure of the carriage, together with its elevator mechanism. The carriage, as very clearly shown in the above mentioned figures, is driven by motor 138 provided with an electromagnetical brake 139 and provided on the shaft thereof with a sprocket 140 around which a chain 141 is threaded, said chain being in turn threaded around sprocket 142 rotatably supported on the stub 143 attached to each of members 42 of the carriage.

The sprocket 142 transmits the movement of the sprocket 140 to the stub 143 and the latter, through a suitable sprocket 144 and through a corresponding chain 145 transmit the rotation of the motor 138 to the sprocket 146 which is directly attached to the axle 147 of one of the wheels 40 which roll on rails 39. The sprocket 146 connected to the axle 147 transmits the movement to a second sprocket (not shown) which in turn transmits the movement through chain 148 to a corresponding sprocket mounted on the axle 147 of the opposite wheel of the same member 42 of the carriage, as shown in FIG. 7 of the drawings. The two opposite wheels 40 of the carriage are driven by means of a projection of shaft 143 of the main sprocket.

A plurality of parking spaces respectively located in the upper and lower parking levels is provided along tunnel 30, and rails 39 are provided with a corresponding plurality of anchoring and positioning blocks 119, fastened by means of bolts 120 to rails 39 as clearly shown in FIG. 8 of the drawings. These anchoring blocks 119, as shown in FIG. 11, are located on opposite sides of each rail 39, and the block 119 located on the outer face of rail 39 is provided with an incline directed towards one direction, while the opposite block 119 is provided with the same incline directed in the opposite direction for a purpose which will be more clearly described hereinbelow.

The blocks 119 cooperate with anchoring members 118 which are provided on the frame members 42 of the carriage, each of said anchoring members 118 having the form of horizontally arranged oppositely directed hooks, each having a hook end 154 to engage the blocks 119 of rails 39.

The anchoring members 118 are pivotally mounted on pivots 121 which, by means of rollers 122, are able to run along the elongated horizontal slits 123 provided in a housing 124 which in turn is integrally built in the members 42 of the carriage, reinforcement members 126 attached to the web surface of members 42 of the carriage being provided to duly support the housing 124.

The pivot 121 of each of the anchoring members 118 is mounted in a forked member 127 which is integrally attached to a rod 128 projecting outwardly of the housing 24 through the wall 130 thereof, said forked member 127 being kept spaced from the wall 130 by means of small helical compression spring 155 as shown in FIG. 8 of the drawings.

The rods 128, extend through a washer 132 and are provided with a threaded end on which nuts 133 and 134 are received in order to support a shock absorbing spring 131 to allow it to exert the appropriate pressure.

A ring 129 is lcoated around each rod 128 and the helical shock absorbing spring 131 is mounted concentrically around each rod 128, between the washer 132 and the ring 129 as clearly shown in FIGS. 7 and 8 of the drawings. Each ring 129 is directly engaged to limit switches 135 and 136 respectively as shown in FIG. 8, for a purpose which will be described in detail below.

The anchoring members 118 are operated by means of two anchor releasing mechanisms, one for each side of the carriage, each said anchor releasing mechanism comprising a lower member 112 having a lower bifurcated end comprising side projections 152 at the lower end thereof, each of said anchoring members 118, as more clearly shown in FIG. 11 of the drawings, being provided with respective bolts 153 which intercept the path of movement of the projections 152, whereby the anchoring members 118 are lifted through the cooperation of bolts 153 with projections 152 of the member 112 when the latter is lifted, while said anchoring members 118 are dropped so as to engage one of the blocks 119 of the rails 39, when the lower member 112 of the anchor releasing mechanism is moved down.

The lower member 112 of each anchor releasing mechanism is connected through a lost motion device, to be described hereinbelow, to an upper member 109 which is in turn engaged to toggle 105 pivotally mounted at 106 on members 42 of the carriage. In order to compensate for the curvature of the motion of the end of the lower arm of toggle 105, the latter is connected to member 109 through the intermediate of a pair of links 107 which translate the rotary motion of the toggle 105 into a rectilinear vertical motion of member 109 and member 112.

The toggle 105 is connected at its other end to a horizontal rod 104 the opposite end of which is pivotally engaged to a crank 103 which in turn is fixed to the same axle as a toggle 102 on member 42 of the carriage, in order to rotate in unison therewith. Toggle 102 is in turn linked, through a vertical rod 101, to a lower toggle 99, each toggle having a caster 197 and 98 respectively, and toggle 99 being pivotally mounted on a suitable lug 100 of a column 44 of the elevator mechanism of the carriage. The casters 197 and 98 are cam followers which coact with cam 97 fixedly mounted at a predetermined position on one of the slides 45 of the elevator mechanism, such that the cam followers 197 and 98 can be acted upon by said cam 97, depending on the vertical position of the elevator mechanism and, in so doing, toggles 102 and 99 pull the rod 104 and toggle 105 in order to lift members 109 and 112 of the anchor releasing mechanism, to thereby lift the anchoring members 118 in order to clear the anchoring blocks 119 and allow the carriage to move freely along the rails 39 driven by motor 138.

Figure 10:
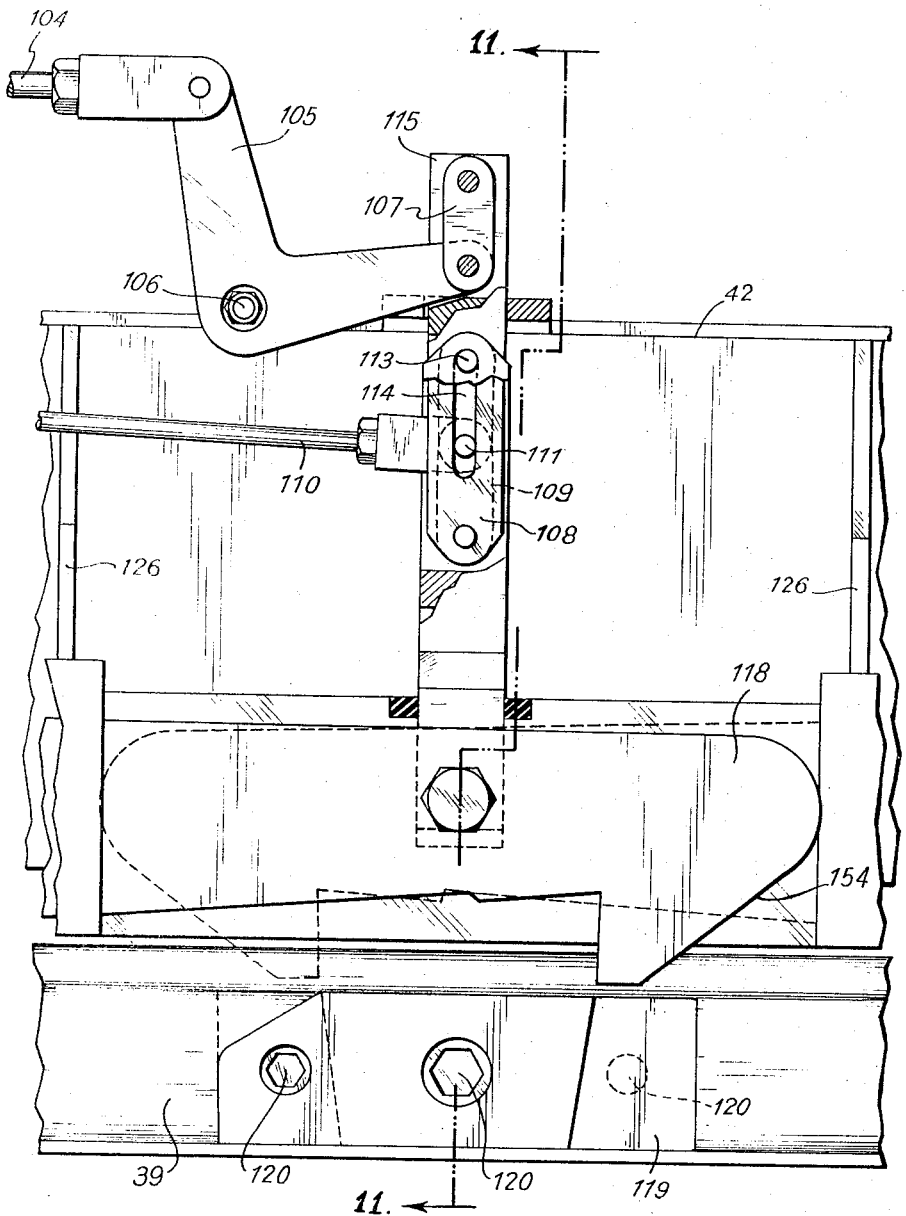
FIG. 10 is a fragmentary enlarged elevational view, similar to FIG. 8, showing the anchoring means of the carriage, as well as the anchor actuating means.

As the anchoring blocks 119 are located along the rails 39 of the tunnel 30 such that the carriage may stop accurately to match a selected parking space when the elevator mechanism is in a position such that either the cam follower 98 or the cam follower 197 is on the cam surface 97, with the upper position of the elevator mechanism corresponding to the carriage moving without the load of a vehicle 59, and with the lower level of the elevator mechanism corresponding to the carriage moving with the load of a vehicle 59, it becomes necessary to additionally provide a secondary mechanism to release the anchoring members 118 in order to stop the carriage at the proper position along rails 39. This secondary mechanism comprises the above mentioned lost motion device to link the upper member 109 to the lower member 112, and being formed by a lower bifurcated end of member 109 and an upper bifurcated end of member 112, arranged in such a manner that member 109 enters within the cavity left by the bifurcated upper end of member 112, as clearly shown in FIGS. 10 and 11 of the drawings. The bifurcated upper end of member 112 is provided with a bolt 113 at its upper end, slidable along a pair of elongated vertical slits provided at the bifurcated lower end of member 109, as clearly shown in FIG. 10 of the drawings, and a pair of parallel links spaced by means of a spacer 116 are provided, pivotally attached to a center pin 111, which in turn pivotally holds a link 108, which lower end is pivotally engaged to a bolt provided at the lower end of the bifurcation of member 109, as clearly shown in FIG. 11. Bolt 111 is pivotally engaged by rod 110, which other end is acted upon by a solenoid 117, said rod 110 being provided with a tension spring 79, with one end attached to said rod 110 and its other end atached to one of the reinforcement members 126, as shown in FIG. 8 of the drawings, such that, when a signal is received in said solenoid 117, the same pulls on rod 110 and bolt 111, thereby dislocating the colinear position of the links 108 of the lost motion device, whereby bolt 113 runs down along the slits of member 109 and the lower member 112 of the anchor releasing mechanism together with the anchoring members 118 are released to be engaged to one of the blocks 119 of the rails 39. When the solenoid 117 is deenergized, spring 79 pulls the rod 110 back, whereby it cooperates with the lost motion device when the elevator and thus cam 97 move to act contrariwise on toggle 102, rod 104 and toggle 105, whereby the lost motion device is returned to the colinear position shown in FIGS. 10 and 11 of the drawings.

In view of the above, it can be clearly seen that there are provided two cooperating mechanisms for lowering and lifting the anchoring members 118, for a purpose which will be clearly described hereinbelow. It is only necessary to clarify that, when the lost motion mechanism is dislocated, then the toggle 105 is unable to lift member 112 to free the anchoring members 118 from the anchoring blocks 119, and thus the carriage remains stably engaged to said blocks in a position accurately designed to allow the elevator mechanism to deliver or take a vehicle 59 to or from a parking space.

The carriage 41 of the present invention comprises four vertical channel-like columns 44, located at each corner of the frame of the carriage. The slides 45 of the elevator mechanism are provided with wheels rolling on the inner walls of each column 44, and are engaged to the two ends of a roller chain 46, which is threaded, as described above, along lower and upper sprockets 47, and around a tensioning sprocket 53 and a driving sprocket 52 which is fixedly mounted on the shaft 51 of the speed reducer 49 driven by motor 48 as clearly shown in FIGS. 7, 8 and 9 of the drawings. The shaft 51 extends along member 42 of the carriage and two driving sprockets 52 are located at predetermined positions along said shaft to match the respective chains 46 engaging the respective slides 45 on which one end of the two tubes or rods 54 of the elevator mechanism are supported. The two other slides 45 which support the opposite ends of the tubes or rods 54, are similarly actuated by means of a roller chain 46 and a sprocket 52 connected to another speed reducer 49 as clearly shown in FIG. 1 of the drawings, both speed reducers 49 being driven by motor 48 by means of shaft 50 as also shown in FIG. 1.

Each pair of parallel slides 45 rotatably support the two ends of the tubes 54 of the elevator mechanism, to which the four sets of vehicle supporting brackets 55 are attached at suitable positions along the length thereof in order to match the spacing of the tires of a vehicle 59 as described above.

The tubes 54 are maintained in a position such that the brackets 55 remain in a horizontal arrangement, by means of a pair of cams 57, one at each end of the tubes 54 as shown in FIG. 1, which are supported in the position shown in FIGS. 7 and 9 of the drawings, by means of a ratchet pawl 186 clearly shown in FIG. 17 of the drawings and which will be described in detail below.

The cam 57 has as its main purpose to retract and extend brackets 55, as necessary, when a vehicle 59 is to be delivered to or taken from a lower parking space as will also be described hereinafter.

A second pair of cams 58 is located at each end of tubes 54 of the elevator mechanism, to cooperate with the bracket retracting mechanism of the lower parking level as will also be described in detail hereinafter.

As described in connectio with FIGS. 1 and 2 of the drawings, the upper parking level is divided into a plurality of individual parking spaces, each parking space being designed to accommodate a vehicle 59 of any predetermined size, and each comprising four comb-like sets of tire supporting brackets 158, which are normally in the retracted position shown by dotted lines in FIG. 12 of the drawings.

Figure 15:
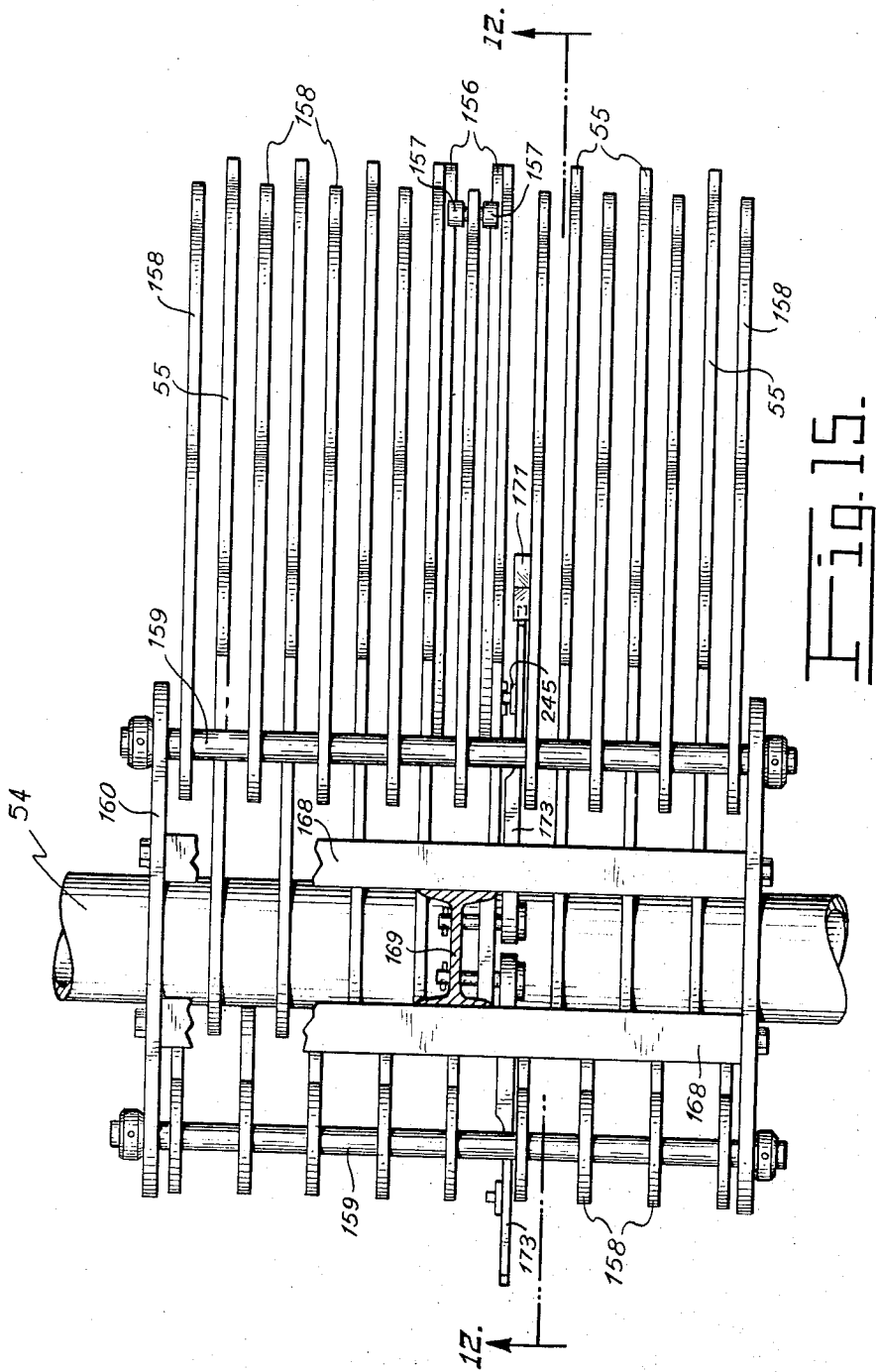
FIG. 15 is a top plan view of one of the upper sets of tire-supporting brackets, showing the corresponding set of the elevator brackets of the carriage interleaved therewith.

The comb-like sets of tire supporting brackets 158 are supported from the roof 170 of tunnel 30, by means of a hanger 169 provided with two struts 168, from the ends of which two supporting plates 160 extend toward opposite directions. As clearly shown in FIG. 15 of the drawings, each set of tire supporting brackets 158 is ganged by a common axle 159, which ends are rotatably supported on plates 160, to freely rotate in unison about the axle 159. Each hanger 169 is designed to support two sets of brackets 158, one for each upper parking space, as clearly shown in FIGS. 1, 12 and 15 of the drawings.

At least one of the brackets 158 is provided with a cam follower 157, and the tire supporting brackets 55 of the elevator mechanism are provided with a cam 156 to act upon said cam follower 157 of brackets 158. As clearly shown in the different dotted and solid line positions of FIG. 12, it will be clearly seen that, being brackets 158 normally in the retracted position, cam 156 of the brackets 55 of the elevator mechanism, which are in the form of an arc of a circle, catches the cam follower 157 which is interposed in the path of movement of the inner end of cam 156 as shown in the dotted line position of FIG. 12, so that, as bracket 55 continues ascending, the cam follower 157 rolls over the upper surface of cam 156, and extends the brackets 158 as shown in the solid line position of FIG. 12. At least on o the brackets 158 comprises a ratchet block 171, with a shoulder 172 to cooperate with the pawl 173 rotatably supported on the hangers 169. The lower edge of the pawl 173 bears on the upper surface of the ratchet block 171 so that, when the brackets 158 are retracted as shown in dotted lines in FIG. 12, the pawl 173 is slightly inclined in a downward direction, and therefore the ratchet releasing arm 245 is also inclined and offset with respect to the path of movement of the pusher 238 which is attached to at least one of the brackets 55. The pusher 238 is provided with an upper receptacle 243 to receive a bolt 244 fixedly mounted at the lower end of the ratchet releasing arm 245, as clearly shown in FIGS. 13 and 14 of the drawings, and the pusher 238 is maintained in a vertical position by means of a helical compression spring 240 provided in a bore of said pusher 238, and acting on a piston 241 which lower end is flat and is accommodated within a flat groove 239 provided on the upper half of the bolt 242 which is fixedly mounted on one of the brackets 55 of the elevator mechanism. Thus, when the pusher 238 is not engaged to the ratchet releasing arm 245, it adopts an upstanding position because of the cooperation of the lower flat end of piston 241 and the upper flat surface of groove 239 of bolt 242.

When the brackets 158 are retracted as shown in dotted lines in FIG. 12, as the pawl 173 bears on the upper surface of the ratchet block 171, said pawl and the corresponding ratchet releasing arm 245, are offset with respect to the path of motion of the pusher 238. Therefore, when the elevator mechanism is carrying the weight of a vehicle 59 to be parked in an upper parking space, then the cam 156 traps the cam follower 157 and extends the brackets 158. As the ratchet releasing arm 245 was offset, the pusher 238 cannot act on the same and as the brackets 55 are lifted to a position slightly beyond the position in which pawl 173 enters into shoulder 172 of the ratchet block 171, then, when the motion of the elevator is reversed, the tires 56 will remain supported by brackets 158, which will be maintained in its extended position by means of the ratchet mechanism 171, 172, 173. Also, as the ratchet mechanism enters into its bracket retaining position, the pusher 238 (in view of the fact that the receptacle 243 has not trapped the pawl 244 of the ratchet releasing arm 245) will be biased from its vertical position, due to the yieldable arrangement of pusher 238 with respect to the groove 239.

On the other hand, when the empty brackets 55 are elevated by the elevator mechanism in order to take the tires 56 of a vehicle 59 which had been previously parked in said upper parking space, as the position of the ratchet releasing arm 245 in this particular instance is strictly vertical, it will be in the path of movement of pusher 238, whereby the receptacle 243 thereof will trap the bolt 244 of the ratchet releasing arm 245, and as the pawl 173 is locked by the weight of the tires 56 which are supported by brackets 158, the spring 240 of pusher 238 will yield and thus will not act on the ratchet releasing arm. Once the brackets 55 are elevated to a position such that the same take the full weight of the vehicle, the spring 240 will be triggered and the ratchet releasing arm 245 will be pushed upwardly, releasing pawl 173 from shoulder 172 of ratchet block 175, whereby brackets 158 will be released. The brackets 55 which now carry the full weight of the vehicle, will then be lowered by the elevator mechanism, and their cams 156 will allow the cam follower 157 to retract, thus retracting the brackets 158 as shown by dotted lines in FIG. 12.

As another preferred embodiment of the vehicle supporting brackets 158, FIG. 16 shows a slightly modified version of said brackets, together with brackets 55 and cam 156. The only difference resides on the ratchet mechanism, which in this particular case is arranged to act in the contrary direction as the ratchet mechanism described in connection with FIGS. 12 to 15 of the drawings. As it will be clearly seen, the ratchet blocks 171 are designed such that the pawl 173 will bear on the lower surface of the block 171 instead of on the upper surface thereof. The pawl 173 is provided with an inclined ratchet releasing arm 245 which cooperates, through a bolt 244, with a similar pusher 238, and is provided with a tension spring 300 which pulls the pawl 173 upwardly. When the bracket 158 is retracted, the block 172 drives the pawl 173 downwardly and thus the bolt 244 is offset so that it cannot be trapped by the receptacle 243 of the pusher 238. Once the bracket 158 has been elevated by the cam 156, the spring 300 will pull the pawl 173 in order to lock it within the shoulder 172 of the ratchet block 171 as shown in FIG. 16 of the drawings. In this position, the ratchet releasing arm 245 will be located in a position such that the receptacle 243 of the pusher 238 will be able to trigger the same, so as to release the ratchet when the weight of the tires 56 is taken by the brackets 55, in a manner entirely similar to what was described in connection with FIG. 12 of the drawings.

As it can be seen from the above, when the elevator mechanism and its tire supporting brackets 55 are operated in order to deliver or take a vehicle 59 to or from a parking space corresponding to the upper parking level, it is not necessary to retract the brackets 55. Instead, the brackets 158 are retracted or extended in order to satisfy the requirements of this operation.

However, when the elevator mechanism is operated to deliver or take a vehicle 59 to and from a parking space corresponding to the lower parking level, it becomes necessary to retract the brackets 55 in order to clear a vehicle 59 which may have been previously parked in a lower parking space, or to extend the same in order to take said vehicle therefrom. The bracket retracting and extending mechanisms for the lower parking level of the underground parking system of the present invention, as well as the lower tire supporting cradles 223 are very clearly shown in FIGS. 17 to 20 of the drawings.

Figure 17:
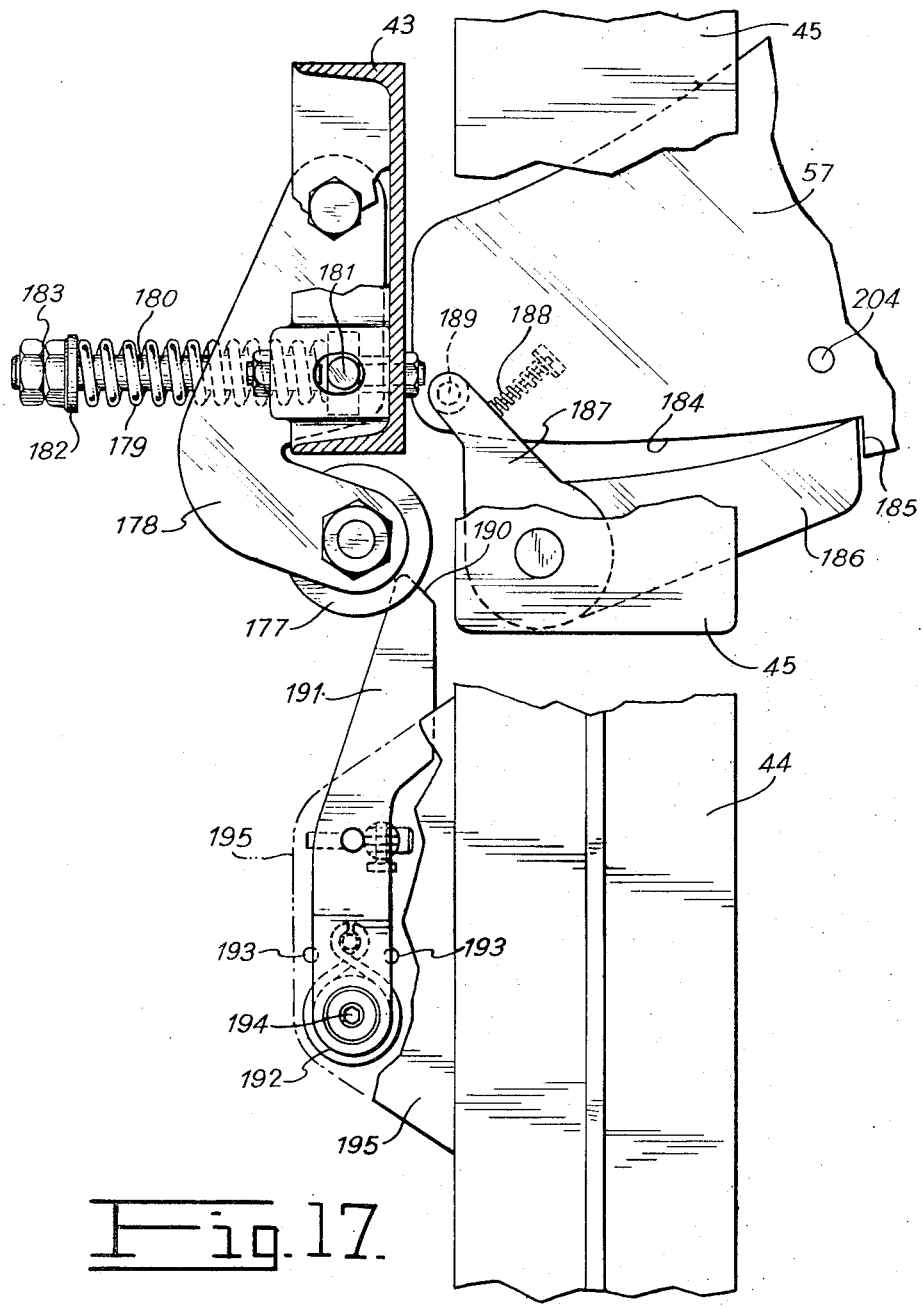
FIG. 17 is a fragmentary detailed elevational view of the mechanism for retracting and extending the tire-supporting brackets of the elevator mechanism incorporated in the carriage.
Figure 21:
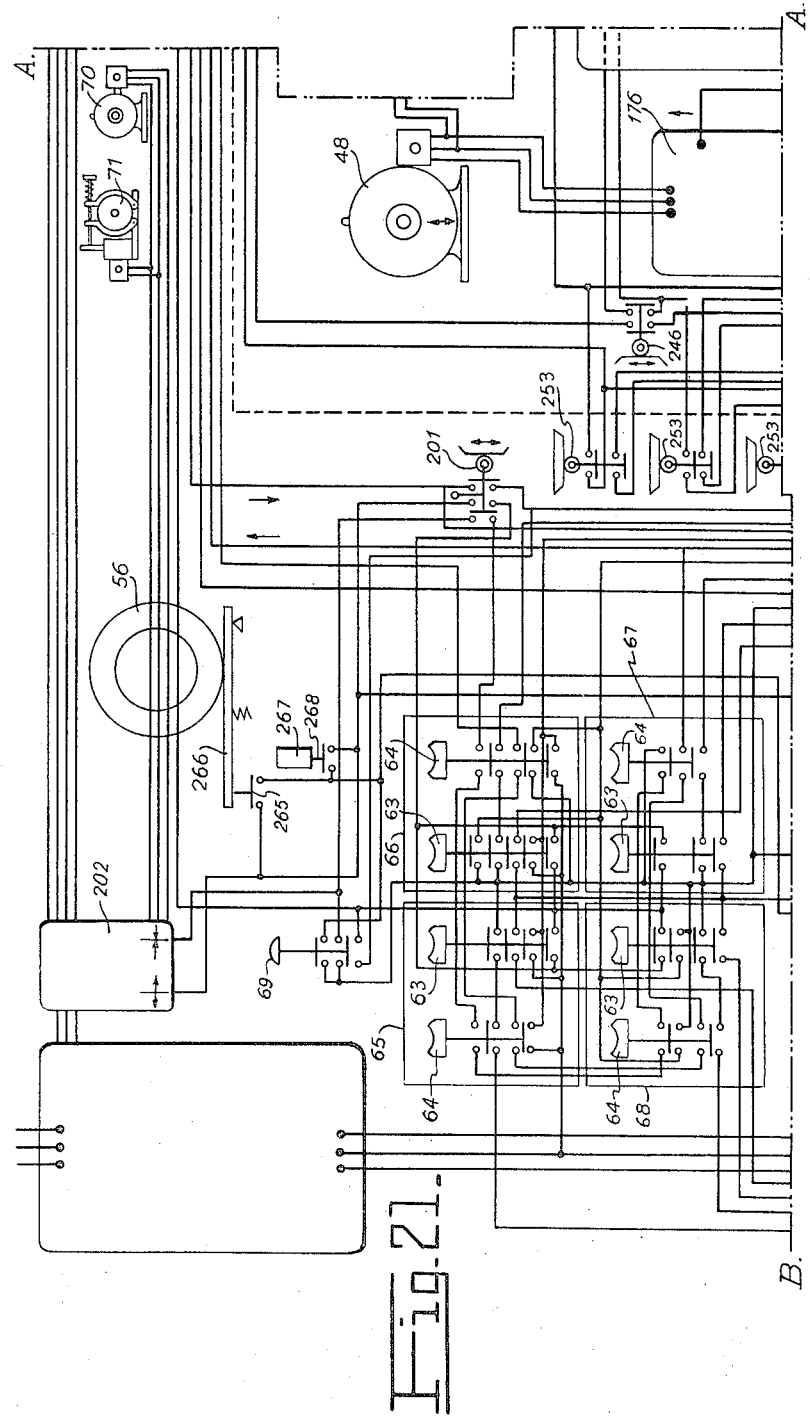

Referring now to FIG. 17 of the drawings, there is shown a bracket retracting mechanism which is also shown in FIGS. 7 and 9, and which is capable of retracting the brackets 55 of the elevator mechanism when the latter are being driven downwardly towards the lower parking level, only when said brackets are not carrying a vehicle 59, but which is uncapable of retracting the same when they carry the weight of a vehicle 59.

As described above, the cams 57 are held in a position such that the brackets 55 remain extended by means of a ratchet mechanism which comprises a pawl 186 which cooperates with a shoulder 185 provided in the lower cam surface 184 of cam 57 as shown in FIG. 17 of the drawings. The pawl 186 is pivotally mounted on the slides 45 which support the tubes 54 of brackets 55, and is provided with a ratchet releasing arm 187 which comprises a roller 189 at the free end thereof, said ratchet releasing arm 187 being held in the locking position by means of a helical spring 188 mounted on the slide 45 by any suitable means.

A lever 178 is rotatably mounted on member 43 of the frame of the carriage, and comprises a cam follower 177 at the free end thereof. The lever 178 is normally forced into the path of movement of cam 57, as sh'wn in FIG. 17, by means of a compression spring 179 supported around a rod 180, which is fixedly mounted on member 43 of the frame of the carriage. One of the ends of said compression spring 179 bears on a pusher 181 slidably mounted on rod 180 and coacting with a complementary hole in lever 178, and the other end thereof bears on a washer 182 fixedly supported on rod 180 by means of a nut 183. A lug 195 mounted on the column 44 of the elevator mechanism of the carriage, rotatably and yieldab'y supports a ratchet releasing lever 191 having an upper cam surface 190 which cooperates with the roller 189 of the ratchet releasing arm 187 of the pawl 186. Lever 191 is rotatably mounted on pivot 194, and is retained in the ratchet acting position by means of a torsion spring 192, and two bolts 193 are provided in order to change the position of spring 192.

The strength of the helical spring 179 which normally forces lever 178 into the path of movement of cam 57, is designed such that, when the brackets 55 carry the weight of a vehicle, cam 57 will overcome the strength of spring 179 and the cam follower 177 will be displaced from the path of movement of cam 57, whereby the pawl 186 will remain in the locked position. The roller 189 of the ratchet releasing arm 187, on account of the pawl 186 being locked, will also push the lever 191 out of the path of movement of said roller, whereby no retraction of the brackets 55 will occur in the downward movement of the loaded elevator.

However, when the brackets 55 do not carry the weight of a vehicle 59, then the strength of spring 179 will overcome the weight of the empty elevator and the inner surface of cam 57 will be pushed by the cam follower 177, thus unlocking pawl 186 from shoulder 185 of the cam surface 184. As the elevator continues descending, the surface 190 of lever 191 will act on the roller 189 of the ratchet releasing arm 187, thus releasing the pawl 186 from the shoulder 185. In this condition, the cam follower 177 will roll on the inner surface of cam 57, and the cam will be rotated together with the corresponding tube 54, whereby the brackets 55 will be completely retracted.

Now referring to FIGS. 18, 19 and 20 of the drawings, if the brackets 55 carrying the weight of a vehicle 59 to be deposited on the cradles 223 of the lower parking level are moved down to the lower parking level, then the cam 57 will reach the lower level in the locked position with pawl 186 latched into shoulder 185 of cam 57 as shown in FIG. 18 of the drawings.

The cradles 223 for supporting the tires 56 of a vehicle 59 in a lower parking space comprise a plurality of frame members 224, supported by means of springs 230 on the bottom 227 of the tunnel 30, whereby the brackets 55 can freely pass between adjacent members 224 of cradles 223 in order to deposit the tires 56 of a vehicle 59 on said cradles.

The mechanism for retracting the brackets 55 when a vehicle is deposited on the cradles 223 of the lower parking level of the underground parking system of the present invention, is clearly illustrated in FIGS. 18 and 19 of the drawings, and comprises a rocking lever 209 pivotally supported by means of pivot 210 on a suitable bracket 211 fixedly mounted on the bottom plate 212 of columns 44 of the carriage. A pair of springs 233 are provided on said bottom plate 212 of the columns 44, to serve as bottom shock absorbers for the elevator slides 45. The rocking lever 209 supports by means of a mechanism comprising a bolt 208, a sleeve 207 and a compression spring 206, a rod 205 in a vertical position. The rod 205 comprises an upwardly opening receptacle capable of receiving the horizontal bolt 204 of cam 57. The other end of the rocking lever 209 is provided with a pusher end 213 which pushes upwardly a piston 214 arranged within a bore of a slide 216 wherein a helical spring 215 is provided to be pressed by piston 214 within said bore. The slide 216 is provided with an upper inclined cam surface 219 which coacts with the roller 189 of the ratchet releasing arm 187 of pawl 186. The slide 216 slides within the bore of a guiding member 217 and is guided by a roller 218 provided at the upper end of the same as clearly shown in FIGS. 18 and 19 of the drawings.

With the above arrangement, when the elevator mechanism carries the height of a vehicle 59, the cam 57 is maintained in a latched position with pawl 186, and thus the bolt 204 of cam 57 will push down the rod 205 and will rock the rocking lever 209, whereby the pusher 213 thereof will push upwardly the piston 214 and compress the spring 215 against the slide 216 which cam surface 219 bears on the roller 189 of the ratchet releasing arm 187. When the elevator leaves the tires 56 of the vehicle on the cradles 223 as shown in FIG. 20 of the drawings, the latching force of cam 57 on pawl 186 is released, by the upward pressure exerted by roller 220 on the undersurface of cam 58, and thus the spring 215 will be triggered, whereby the slide 216 will push roller 189 of the ratchet releasing arm 187, and thus the pawl 186 will be unlatched from the shoulder 185 of cam 57. Cam 57 nevertheless does not rotate on being released, because in this position, as clearly shown in FIG. 20 of the drawings, the secondary cam 58 remains with its lower cam surface bearing on a roller 220 provided on a lug 221 fixedly mounted on column 44 of the carriage. However, when the elevator mechanism commences its ascending movement, the cam 58 is guided by roller 220 and then by roller 234 supported on the lug 235 also fixedly mounted on column 44, so that the brackets 55 are retracted as clearly shown by the dotted lines in FIG. 20 of the drawings.

Now, when the brackets 55 do not carry a vehicle, the retracting mechanism of FIG. 17 retracts the brackets 55, as described above, and said brackets will reach the lower level in a retracted position. The cam 58 which in this condition is arranged in a position as shown by the dotted lines in the upper left corner of FIG. 20, slides on roller 234 and then on roller 220, whereby the brackets 55 are extended and, as the bolt 204 of cam 57 is offset from the path of movement of the receptacle of rod 205 of the rocker lever 209, aid rod 205 will not act the bracket retracting mechanism described above. Once the rollers 234 and 220 extend the brackets 55, the ratchet mechanism 185, 186 will be locked and the brackets 55 will be in a condition ready to take the weight of the tires 56 of a parked vehicle, in order to carry the same upwardly to the transit level as will be described in detail hereinbelow.

While applicant does not wish to be bound to any electrical or electronic circuit to be used to act the underground parking system in accordance with the present invention, FIGS. 21 to 24 illustrate a preferred electric circuit to act the different mechanisms thereof in a completely automatic manner.

As it will be clearly apparent to any one skilled in the art, the underground parking system in accordance with the present invention can be operated by means of any suitable type of sequence programming circuit which may satisfy the essential requirements of the operations which will be briefly described hereinbelow.

A vehicle 59 is driven along channels 60, for instance, through the underground passage 34 until the tires thereof rest on the surfaces of the grids 37 of doors 36. Once the tires 56 of the vehicle 59 are located in the position shown in FIG. 2 of the drawings, the elevator mechanism, which by the time is in its zero position, that is, with the brackets 55 extending a slight distance upwardly of the members 84 of grids 37, takes the weight of the tires 56, thus releasing the grids 37 and consequently the doors 36. The doors 36 are then opened by motor 40 and the banister 89 is extended to protect the opening left by the doors. Suitable signaling devices (such as limit switches 93 and 94 of FIG. 22) will start motor 48 sending the elevator down to the lower transit sub-level of the intermediate transit level 32. The anchoring members 118 are at this time duly latched on the anchoring block 119 of the zero position in order to avoid any unadverted motion of the carriage 41. In order words, while the elevator is acting, the carriage 41 must remain motionless in a position such that the brackets 55 duly coact with the grids 37. As the elevator mechanism must go down to a lower transit sub-level suitable to provide for complete clearance of the vehicle 59 being transported on the carriage through the intermediate transit level 32, the cam 97 must pass through the cam follower 197 and thus will act on the rod 104 which unlatches the anchors 118. However, as the brackets 55 are carrying the weight of a vehicle, then the cam 57 will act on the lever 178 at the same time cam 97 is acting on cam follower 197, and lever 178 acts on a switch 196 (FIG. 22) which activates solenoid 117, thus releasing the lost motion mechanism of the anchors, whereby the toggle 102 acted by cam 97, will not unlatch the anchors 118 from the anchoring block 119 of the rail 39. The elevator mechanism will therefore continue its descending motion, and after the cam 57 deenergizes solenoid 117, the lost motion mechanism of the anchor releasing device will be returned to its colinear position and retained therein by the cooperation of spring 79. However, the anchors will remain latched because cam 97 is no longer acting on toggle 102. Once cam 97 reaches the position of cam follower 98, said cam will act on cam follower 98 whereby the toggle 99, through the vertical rod 101 and toggle 102, will act on crank 103 and rod 104, and the anchors will be immediately unlatched from the anchoring block 119. The unlatching of the anchors will operate a suitable signaling device to stop motor 48 and actuate brake 96 of the elevator mechanism, and to simultaneously start motor 138 and release brake 139 of the carriage 41, whereby said carriage will be driven along the length of tunnel 30 on rails 39.

The underground parking system of the present invention is provided with means for detecting any empty parking space in the tunnel 30, which in the case of the upper parking spaces comprises a limit switch 150, which, when the brackets 158 are retracted, is in a closed contact position, whereby for instance a roller contact or bruch 199 provided along rail 39 will be energized. In the case of the lower parking spaces, the cradles 223 are resiliently mounted on floor 227, by means of bolts 228 as shown in FIG. 20 of the drawings, with nuts 227 which permit a small amount of motion of the cradles which are supported by the springs 230.

When the cradle 223 does not carry the weight of the tires 56 of a vehicle 59, then the springs 230 will bias said cradle upwardly to abut with the nuts 229, and the limit switch 231 will be closed, whereby, when the lower parking space is empty, said limit switch 231 will close a circuit to activate a contact such as the roller contact or brush 232 (FIG. 24) situated on the walls of tunnel 30 in line with the sliding contactors 166 and 151.

The carriage can be complementarily provided with a plurality of said sliding contacts or members 151, to cooperate with contacts 199 and 232 which are arranged at positions along the walls of tunnel 30 so that, when the carriage passes through a position coinciding with an empty parking space, the upper or lower contactor 151 will close a circuit with contact 199 or 232, which will energize solenoid 117 and will release the anchors 118.

When the anchoring members 118 are released, motor 138 and brake 139 are deenergized by means of a signaling device, whereby brake 139 will operate to stop the carriage. The anchor 118 which is located with its hook end 154 in a downstream position, jumps its corresponding anchoring block 119 by means of an incline provided on the same, in order to locate its hook end in a position suitable for backwardly engaging the anchoring block. The anchor which has its hook end in an upstream position, merely latches with the corresponding block 119, and the spring 131 corresponding to said anchor member 118 dampens the stoppage of the carriage 41 until both anchors 118 remain latched with the two anchoring blocks 119 of the corresponding position.

The springs 131 act on the limit switches 135, 136 (see FIG. 8), and these limit switches send a signal so as to immediately start the operation of the motor 48 of the elevator mechanism, in order to place the vehicle conveyed by said carriage in the empty parking space detected.

As the motor 138 which operates the carriage along the rails 39 is capable of running at two different speeds, there are provided two more series of contactors 166, in order to detect in advance the empty parking space, so as to give sufficient time for the brake 139 to stop the carriage when it is being driven at high speed.

If the empty parking space detected corresponds to the upper parking level of the tunnel 30, then the signal sent will be such that the motor 48 of the elevator mechanism will be operated in a direction suitable to elevate the brackets 55 carrying a vehicle 59.

The vehicle 59 is then taken by the upper tire-supporting brackets 158 as described above, and a microswitch 174 may be provided to cooperate with a cam 250 (FIG. 22) which can be mounted on one of the slides 45 of the elevator, in order to reverse the movement of the motor 48 of the elevator mechanism once the weight of the tires 56 of the vehicle 59 is taken by brackets 158. The elevator descends in an empty condition and, therefore, when the cam 97 acts the cam follower 197, as the cam 57 is pushed towards the right as seen in FIG. 7 by the cam follower 177, the solenoid of the anchor releasing lost motion mechanism is not energized and thus the toggle 102 releases the anchors 118 from the corresponding anchoring block 119 and the limit switch 137 shown in FIG. 11 immediately stops the elevator and starts the carriage to be displaced along the rails 39.

If the parking space selected is a lower parking space, then the elevator will be acted by motor 48 in such a direction that it will descend. As the brackets 55 carry the weight of a vehicle 59, the bracket retracting lever 178 will not act on cam 57 as described above, and brackets 55 will remain extended until the lower cradles 223 take the weight of the tires 56 as shown in FIG. 20 of the drawings. The brackets 55 will next be unlatched by the ratchet releasing mechanism of FIGS. 18 and 19, and the cam 58 will retract the brackets 55 as described above. A limit switch 222 (FIG. 24) may be provided to coact with cam 250 in order to reverse the motion of the motor 48, whereby the elevator mechanism will be raised. As cam 57 is now in a retracted condition, the cam surface 236 provided in said cam 57, will be extended to actuate a limit switch 237 (FIG. 23) so as to energize solenoid 117 in order to retain the anchoring members 118 latched to the anchoring block 119, when cam 97 actuates cam follower 98, thus permitting the elevator mechanism to reach the upper sublevel of the transit level.

The cam 57 is extended together with the corresponding brackets 55, by the cam follower 117 which, in the ascending movement of the elevator, rolls on the upper cam surface of cam 57, until said surface clears the follower 177 as will be obvious to any one skilled in the art. In this position, cam 97 of the slide 45 of the elevator, will act on cam follower 197, which through the action of the toggle 102 and rod 104, unlatches the anchoring members 118, inasmuch as the solenoid 117 has not been energized in this position. When the anchors are unlatched, the corresonding signaling device such as the limit switch 137 (FIG. 11) will stop the motion of the motor 48 and will start the motion of the motor 138 in order to drive the carriage along rails 39.

The operation of the carriage for taking a car from a parking space is exactly the same as for parking a car in an empty parking space, with the exception that the retraction and extension of the different brackets is effected in an inverted manner, and that the sliding contactors 151 and 166 are disconnected from each other and instead the parking space is selected by sliding contactors 248 and 258 coacting with contacts 252 (FIG. 24) and the numbered keys 247 (FIG. 23).

The preferred exemplary circuit illustrated in FIGS. 21 through 24, comprises a keyboard 62 (FIG. 1) which is divided into four keyboard sections 65, 66, 67 and 68, each one comprising a pair of keys 63 and 64 for introducing a car into the parking system and taking a car from said parking system, depending on the zone in which said car is located. In other words, these four keyboard sections are provided such that each one will select a zone of the underground parking system, for instance, upper left, upper right, lower left and lower right, respectively. A main key 69 is provided to start all the circuitries of the underground parking system of the invention and a series of secondary progressively numbered keys 247 are provided to select the vehicle which it is desired to take from the parking system. The parking system comprises a plurality of lights 259 which very clearly indicate the zone and the number of the parking place in which the vehicle selected is parked.

The motor 70 and brake 71 for opening and closing the doors 36, are started by means of a reversible starter 202 and are activated either automatically by means of a weight-acted loose plate 266 which actuates the limit switch 265 through the weight of one of the tires 56, as shown in FIG. 20, or manually by means of a push-button 267 which actuates a switch 268 having the same function as switch 265. The doors are provided with limit switches 264 to secure, as one of their functions, that the doors are perfectly closed, and with limit switches 93 and 94, which secure, as one of their functions, that the doors are fully open to admit a vehicle 59 into the parking system, as shown in FIG. 22 of the drawings.

Preferably the motor 138 of the carriage, which is a sliding-ring wound-rotor motor, as well as the brake 139, are energized by means of a reversible starter 198, and motor 138 is provided with a plurality of resistors 161 and 162 (FIG. 22) which are cut off by shortcircuiting through the time relays 163 and 165 (FIG. 24), to provide different speeds of the motor 138.

The motor 48 and brake 96 of the elevator, are energized through a reversible starter 176, in order to actuate the elevator mechanism of the underground parking system of the present invention.

The limit switch 201 (FIG. 21) which is a mechanical retention limit switch, is actuated by means of a cam provided in one of the slides 45 of the elevator mechanism of the carriage, and is closed by said cam and retained in its closed position to actuate the motor 70 to close the doors 36 once the top of a vehicle has passed down said doors, in order to enable them to receive a second vehicle at once.

The limit switches 253 are provided on the walls of tunnel 30 only at the "zero" position, that is, a position in which the carriage is directly under the doors 36 of the parking system of the present invention, so as to latch the anchors by means of the sliding contactors 151 and solenoid 117, when the carriage reaches said position.

The limit switch 246 is provided to be actuated by means of a suitable cam (FIG. 21) provided in one of the slides 45 of the elevator of the carriage, to act in the lower transit sub-level to energize solenoid 117, in order to avoid releasing of the anchors when the anchor releasing system actuates in this position of the elevator.

The energy supply lines 258 are provided with suitable trolleys 255, to carry the energy to the carriage, in any position or condition of said carriage. A plurality of secondary trolleys 257 are provided in order to receive signals from the keyboard 62, to effect different operations, and a plurality of slidable contactors 254 is also provided, in order to establish contacts for all the necessary operations of the carriage.

The relay 200 (FIG. 23) actuates for disconnecting the roller contact or brush 199 corresponding to the "zero" position, as well as solenoid 117 when the carriage starts its translation movement from said position, in order to avoid said solenoid to work.

The relay 262 cooperates with relay 200 in energizing the contact or brush 199 corresponding to the "zero" position, as well as in energizing the contacts of the key 64 of the selected zone.

The relay 263 is provided to delay the start of motor 70 of doors 36 when the opening of said doors is started.

The relay 203 is provided to alternately energize the starters of the motors 48 and 138 in cooperation with the reversible relay 175 and the relay 167 is provided to disconnect the foreward sliding contactors when the motor is running at low speed, inasmuch as in this case it is not necessary to provide a circuit between the contactor 166 or 258 and the roller contacts or brushes 199, 232 or 252.

The limit switches 174 and 222 are used mainly to reverse the motion of the motor of the elevator of the carriage, when the same reaches the upper and lower positions respectively.

The switch 249, as well as the switch 260, ar actuated by means of a cam 250 provided in one of the slides 45 of the elevator, switch 249 being actuated when the elevator is running through the upper transit sub-level of the transit level, while switch 260 is actuated when the elevator is running through the lower transit sub-level, that is, when the carriage is carrying a vehicle 59, in order to disconnect the upper and lower sliding contactors from the intermediate sliding contactors, to permit the former to select an empty parking space in the selected zone and to deliver the transported vehicle thereto. On the other hand, said switch 249 is actuated by cam 250 when the elevator is moving along the upper transit sub-level of the transit level, having as one of its functions that of connecting the intermediate sliding contactors 258 or 248 with the upper and lower sliding contactors 166 or 151, in order to have them all duly interconnected and prepared to take a vehicle from the parking system.

Finally, the reversible relay 175, coacts with the limit switches 174 and 222, in order to reverse the motion of the motor 48 of the elevator mechanism in the upper and lower positions thereof.

Although certain specific embodiments of the present invention have been shown and described, it will be apparent to any one skilled in the art that many modifications thereof are possible, particularly as regards the electric circuitry which can be used, without departing from the true scope and spirit thereof. The invention, therefore, is not to be restricted except insofar as is necessitated by the prior art and by the spirit of the appended claims.

I claim:

1. An underground automatic parking system for vehicles, which comprises a horizontal tunnel, said tunnel being divided into an upper parking level comprising a plurality of parking spaces, a lower parking level comprising a plurality of parking spaces and an intermediate transit level comprising a lower transit sub-level and an upper transit sub-level; automatic access means arranged on the roof of said tunnel; a track in each one of the side walls of said tunnel and arranged along the length thereof; a carriage adapted to move on said tracks along said transit level; an elevator in said carriage, operable along hollow vertical columns carried by said carriage and extending all the height of the tunnel, said elevator having simultaneously retractible vehicle tire supporting brackets capable of being carried by said elevator up to a level slightly higher than the level occupied by said automatic access means in order to release the latter so that the same can be operated to give access to a vehicle into the said tunnel, said automatic access means being provided with complementary slits to allow passage of said retractible brackets; means for moving said retractible brackets between and extended operative position and a retracted position; anchoring means for stopping the movement of said carriage along the tunnel in each parking space thereof; vehicle tire supporting means in each parking space of the upper parking level comprising a plurality of simultaneously extendible brackets; means in said elevator to force said extendible brackets to move between a retracted position and an extended supporting position when said retractible brackets of the elevator are carrying a vehicle in the ascending movement thereof and in order to retract said extendible brackets in the descending movement of the elevator when said extendible brackets support a vehicle; vehicle tire supporting means in each parking space of the lower parking level comprising stationary cradles through which the elevator brackets can pass when the same support a vehicle; means arranged in the lower parking level to retract the elevator brackets in the ascending movement thereof when they are not supporting a vehicle; means for retracting the elevator brackets in the descending movement toward the lower parking level, when they are not supporting a vehicle; and electric sequence programming means to sequentially effect all the necessary movements of the system.

2. An underground automatic parking system according to claim 1 wherein said automatic access means comprises a pair of horizontally slidable doors provided with a plurality of grids in positions suitable to allow passage of the brackets of said elevator to a level slightly higher than the level thereof; rack and pinnion means for opening and closing said doors; and guiding channels to guide the tires of the vehicles to be parked in order to secure that the latter will be placed accurately on the grids and will be lifted by said elevator brackets to release the doors and allow the opening movement thereof to give access to the vehicle into the tunnel.

3. An underground automatic parking system according to claim 2 wherein said automatic access means also comprises a retractible banister which is acted upon by said rack and pinnion means to be retracted when the doors are closed and to be extended when the doors are open.

4. An underground parking system according to claim 1 wherein said carriage comprises a frame; motor means on said frame capable of driving said carriage along said tracks in any of two opposite directions, said anchoring means being attached to the side members of the frame and comprising a pair of anchors each of which is shaped as a hook to be latched when moving along a horizontal direction, one of said anchors being arranged with its hook end in a downstream position while the other anchor is arranged in the opposite direction; and means to operate said anchors by releasing the same to a suitable level which permits them to be latched with one of a plurality of anchoring blocks arranged along each one of said tracks in positions suitable to accurately stop the carriage at one of a plurality of said parking spaces, each of said anchors being resiliently supported on said frame to be latched with said anchoring blocks with a shock absorbing motion, the arrangement being such that the anchor which hook end arrives in a downstream position to said anchoring block will jump the same to be latched therewith in a backward direction while the other anchor will be directly latched with said anchoring block upon its arrival thereto.

5. An underground automatic parking system according to claim 4 wherein said means to operate said anchors comprises an upper vertical member; a lower vertical member colinearly arranged to said upper member and coupled therewith by means of a lost motion articulated coupling which, when dislocated, is capable of releasing the lower member in order to latch the anchors on said anchoring blocks and which, when colinearly arranged, is capable of engaging said upper and lower members for integral movement thereof; a toggle pivotally attached to the upper end of said upper member; means for pulling said toggle to raise the upper member, located at said two transit sub-levels, the upper sub-level corresponding to the movement of the carriage without a vehicle and the lower sub-level corresponding to the movement of the carriage with a vehicle; means for dislocating said lost motion articulated coupling in said upper sub-level when the carriage is not carrying a vehicle and in said lower sub-level when the carriage carries a vehicle; and means for maintaining said lost motion articulated coupling in a dislocated position during the ascending and descending movements of the elevator toward the upper and the lower transit sub-levels respectively, in order to avoid the anchors to be unlatched from the respective anchoring block at the undesired transit sub-level.

6. An underground automatic parking system according to claim 5 wherein said lost motion articulated coupling comprises a first forked element at the upper end of said lower member, a second forked element at the lower end of said upper member parallelly housed within said first forked element; a guiding slit in said second forked element; a bolt coupled to the upper end of said first forked element and slidable within said guiding slit; a first link articulated to said bolt; a second link pivotally attached to the end of said second forked element, the free ends of both links being pivotally engaged to each other by means of a center pivot; and a pulling rod coupled to said center pivot arranged between said first and second links in order to move the same between a colinear position and an angular dislocated position in response to said dislocating means.

7. An underground automatic parking system according to claim 6 wherein said dislocating means comprises a solenoid electromagnetically coupled to the free end of said pulling rod in order to pull the same in opposition to resilient means which bias said center pivot to a colinear link position.

8. An underground automatic parking system according to claim 7 wherein said means for pulling the toggle pivotally attached to the upper end of said upper member of the anchor operating means comprises a rod coupled to a tandem-type cam follower arranged to be actuated in two positions corresponding to said upper and lower transit sub-levels; and a cam arranged in said elevator in a position such that it actuates said cam follower at said two mentioned positions in order to pull the rod and unlatch the anchors from their respective anchoring block when said dislocating means are not acting on said lost motion articulated coupling.

9. An underground automatic parking system according to claim 8 wherein said means for maintaining said lost motion articulated coupling in a dislocating position during the ascending and descending movements of the elevator from the lower parking level to the upper transit sub-level and back in order to pass through the lower transit sub-level without unlatching the anchoring means from the corresponding anchoring block comprises a cam located in a position on said retractible brackets of the elevator such that said cam can only act when the same are retracted; and a limit switch engageable by said cam when said tandem-type cam follower is actuated by its corresponding cam, said limit switch being connected to said solenoid to energize the same when the cam acts thereupon.

10. An underground automatic parking system according to claim 9 wherein said plurality of retractible brackets of the elevator comprises a plurality of parallel brackets ganged on a common axle to form a pair of retractible comb-like sets of brackets, which are normally extended and which support each longitudinal pair of vehicle tires; a first bracket-retracting cam at each end of said common axle; a ratchet mechanism on the end of said first bracket-retracting cam in order to maintain the same in an operating position whereby the comb-like sets of brackets will remain extended; a second bracket-retracting cam at each end of said common axle, a first cam operating device to operate said first bracket-retracting cam, arranged in the carriage at a level corresponding to the upper transit sub-level; and a second cam operating device to operate said first and second bracket-retracting cams, arranged in said carriage at a level corresponding to the lower parking level.

11. An underground automatic parking system according to claim 10 wherein said first cam operating device comprises a roller-type cam follower capable of guiding said first cam between extended and retracted positions; a spring capable of pushing said follower and said cam when the associated comb-like sets of brackets of the elevator are not carrying the load of a vehicle, but which yields to the weight of said comb-like sets of the elevator brackets when the latter are carrying the load of a vehicle; and a ratchet releasing lever resiliently supported on said carriage such that it will be capable of releasing said ratchet mechanism of the first bracket-retracting cam only when said cam has been displaced by said roller-type cam follower.

12. An underground automatic parking system according to claim 10 wherein said second cam operating device comprises a plurality of suitably arranged stationary rollers attached to said carriage and capable of guiding said second bracket-retracting cam between extended and retracted positions; a rocking lever pivotally engaged to the lower end of each column of the elevator; a vertical pin on one of the ends of said rocking lever, the upper end of said pin being coupled to said first bracket-retracting cam; a yieldable vertical shank at the other end of said rocking lever, the upper end of said shank being coupled to the pawl of the ratchet of said first bracket-retracting cam, said yieldable shank being operated by a spring which will yield when the elevator brackets are carrying the load of a vehicle, but which will not yield when said elevator brackets are not carrying the load of a vehicle, whereby the ratchet will be released permitting the second bracket-retracting cam to be guided on said plurality of stationary rollers toward the bracket retracted position.

13. An underground automatic parking system according to claim 11 wherein said means for maintaining said lost motion articulated coupling in a dislocated position during the descending and ascending movements of the elevator from the upper parking level to the lower transit sub-level and viceversa in order to clear the upper transit sub-level without allowing the anchoring means to be unlatched from the corresponding anchoring block comprises a limit switch actuatable by said first bracket-retracting cam only when the latter is pushed against said roller-type cam follower by the weight of a vehicle, said limit switch being in circuit with said solenoid to energize the same when said cam is engaged therewith.

14. An underground automatic parking system according to claim 10 wherein said means in the elevator for extending and retracting said extendible brackets of the upper parking level comprises a cam follower in at least one of said brackets, a cam in at least a corresponding one of the retractible brackets of the elevator, said cam being engageable by said cam follower to move said extendible brackets between a retracted position and an extended position; a ratchet mechanism for maintaining said extendible brackets in its extended position; and means for releasing said ratchet mechanism only when said extendible brackets do not support the load of a vehicle.

15. An underground automatic parking system according to claim 1 wherein said elevator comprises a plurality of vertical hollow columns integrally built in said carriage; a corresponding plurality of vertical slides movable along said columns and coupled to a respective one of the common axles of said retractible brackets of the elevator; motor means for driving said slides up and down said columns; and shock absorbers at the ends of said columns to avoid shocks of said slides.

16. An underground automatic parking system according to claim 14 wherein said means for releasing the ratchet mechanism of said extendible brackets to release the same and allow them to move toward its retracted position when not supporting the load of a vehicle comprises a vertical yieldable pusher in at least one of said elevator brackets; and a ratchet releasing arm integrally provided on the pawl of said ratchet mechanism and arranged in a vertical colinear position to said yieldable vertical pusher, said vertical pusher being actuated by a spring which yields when said extendible brackets are carrying the load of a vehicle, but which actuates said arm when said extendible brackets are not carrying the load of a vehicle in order to release the pawl of the ratchet mechanism.

17. An underground automatic parking system according to claim 1 wherein said electric sequence programming means comprises manually operable control means to select one of respective right and left sections of the upper and lower parking levels; means for detecting any empty parking space in each of said sections; means for detecting a predetermined parking space previously occupied by a desired vehicle; means for stopping the motor of the elevator at the desired transit sub-level and to simultaneously start the motor of the carriage and viceversa; means for reversing the movement of the elevator in the upper and lower parking levels; means for reversing the movement of the carriage in the parking spaces and in the access means; means for changing the speed of the carriage depending on the distance which said carriage must travel; and safety means for stopping the whole system when any of the different elements thereof fails.

18. An underground automatic parking system according to claim 17 wherein said means for detecting an empty parking space comprises a lower set of stationary contacts and an upper set of stationary contacts both arranged along the tunnel; and at least a sliding contactor means in said carriage to close a circuit with one of said contacts of any of the two sets, thereby sending a signal to a master control which stops the motion of the motor means of the carriage in advance of the place where the anchoring means are to be latched with the respective anchoring block, and another signal which energizes the said dislocating means of the anchoring means.

19. An underground automatic parking system according to claim 18 wherein said contacts of the lower set are energized only when they correspond to an empty parking space by means of limit switches associated with the supporting cradles of the lower parking level, said cradles being mounted on spring means which space them from the floor but which are forced to yield by the weight of a parked vehicle to actuate said limit switches and deenergizE said contacts.

20. An underground automatic parking system according to claim 18 wherein said contacts of the upper set are energized only when they correspond to an empty parking space by means of limit switches associated with the extendible brackets of the upper parking level, said limit switches being actuated only when said brackets are retracted to correspondingly energize said contacts.

21. An underground automatic parking system according to claim 18 wherein a further set of intermediate contacts is provided along said tunnel and at least a further sliding contactor device is provided in said carriage to close a circuit with one of said contacts, said further series of contacts being interconnectable with said lower and upper sets of contacts, to jointly actuate in order to detect a preselected parking space so as to directly send the carriage to said parking space upon a command from the master control, said interconnection being capable of simultaneously deenergizing the lower and upper sets of contacts which detect an empty parking space.

22. An underground automatic parking system according to claim 17 wherein said means for stopping the motor means of the elevator and starting the motor means of the carriage comprises at least a limit switch actuated by said anchoring means when the latter are unlatched from its corresponding anchoring block, in order to send a signal which stops said motor means of the elevator and starts said motor means of the carriage, both said motor means being provided with brake means which are energized and deenergized by the same signal.

23. An underground automatic parking system according to claim 18 wherein at least a further sliding contactor device is provided in the carriage in an advanced position with respect to the direction of motion of said carriage, to be electrically coupled with one of said stationary contacts of said upper and lower sets in order to send said signal to stop the motor means of the carriage sufficiently in advance of the place where the anchoring means are to be latched to the corresponding anchoring block, when said carriage is operating at its highest speed.

* * * * *